US012771905B2

(12) United States Patent
Shin et al.

(10) Patent No.: US 12,771,905 B2
(45) Date of Patent: Oct. 20, 2026

(54) APPARATUS FOR PHOTO SELECTION AND METHOD THEREOF

(71) Applicant: Match Group, LLC, Dallas, TX (US)

(72) Inventors: Eunhyouk Shin, Seoul (KR); Joonyoung Yi, Seoul (KR); Lawrence Anthony Sequino, Los Angeles, CA (US); Kyle Garrett Miller, Los Angeles, CA (US)

(73) Assignee: Match Group, LLC, Dallas, TX (US)

( * ) Notice: Subject to any disclaimer, the term of this patent is extended or adjusted under 35 U.S.C. 154(b) by 0 days.

(21) Appl. No.: 18/965,526

(22) Filed: Dec. 2, 2024

(65) Prior Publication Data

US 2025/0097530 A1 Mar. 20, 2025

Related U.S. Application Data

(63) Continuation-in-part of application No. 18/847,058, filed as application No. PCT/US2024/043267 on Aug. 21, 2024.

(60) Provisional application No. 63/534,087, filed on Aug. 22, 2023.

(30) Foreign Application Priority Data

Nov. 30, 2023 (KR) ........................ 10-2023-0171545

(51) Int. Cl.

| | |
|---|---|
| ***H04N 21/45*** | (2011.01) |
| ***G06V 40/16*** | (2022.01) |
| ***H04N 21/4545*** | (2011.01) |
| ***H04N 21/466*** | (2011.01) |

(52) U.S. Cl.
CPC ....... *H04N 21/4532* (2013.01); *G06V 40/172* (2022.01); *H04N 21/4545* (2013.01); *H04N 21/4666* (2013.01)

(58) Field of Classification Search
None
See application file for complete search history.

(56) References Cited

U.S. PATENT DOCUMENTS

| | | | |
|---|---|---|---|
| 9,560,156 | B1 | 1/2017 | Rana et al. |
| 11,698,947 | B2 | 7/2023 | Cowen et al. |
| 12,591,863 | B2 | 3/2026 | Sequino et al. |
| 2005/0171940 | A1 | 8/2005 | Fogg et al. |
| 2007/0220045 | A1 | 9/2007 | Morris et al. |
| 2011/0072085 | A1 | 3/2011 | Standley |
| 2013/0113814 | A1 | 5/2013 | Howard |

(Continued)

FOREIGN PATENT DOCUMENTS

| | | | |
|---|---|---|---|
| JP | 2021092927 | A | 6/2021 |
| JP | 2021189647 | A | 12/2021 |
| KR | 20130117442 | A | 10/2013 |

OTHER PUBLICATIONS

USPTO Non-Final Office Action in U.S. Appl. No. 18/903,681 dated Aug. 4, 2025, 31 pages.

(Continued)

*Primary Examiner* — Omar S Parra
(74) *Attorney, Agent, or Firm* — Patent Capital Group

(57) ABSTRACT

A method is implemented by a computing device and includes taking a first photo with a camera of the device; determining an embedding of the first photo; identifying a second photo stored in the device, at least in part based on the embedding of the first photo; and uploading the second photo.

20 Claims, 25 Drawing Sheets

(56) References Cited

U.S. PATENT DOCUMENTS

| | | | | |
|---|---|---|---|---|
| 2014/0006395 | A1 | 1/2014 | Wolfe et al. | |
| 2014/0149843 | A1 | 5/2014 | Sharma et al. | |
| 2014/0156416 | A1 | 6/2014 | Goenka et al. | |
| 2015/0287146 | A1 | 10/2015 | El Daher | |
| 2015/0296045 | A1 | 10/2015 | Deng et al. | |
| 2015/0310040 | A1* | 10/2015 | Chan | G06V 40/16 707/738 |
| 2016/0034955 | A1 | 2/2016 | Yerli | |
| 2016/0042429 | A1 | 2/2016 | Bank et al. | |
| 2017/0091849 | A1 | 3/2017 | Greystoke et al. | |
| 2017/0109853 | A1 | 4/2017 | Ferdinand | |
| 2017/0364521 | A1 | 12/2017 | Posse et al. | |
| 2018/0063278 | A1 | 3/2018 | Helled et al. | |
| 2018/0308125 | A1 | 10/2018 | Avegliano et al. | |
| 2018/0337928 | A1 | 11/2018 | Pelletier | |
| 2019/0080012 | A1 | 3/2019 | Huang et al. | |
| 2020/0089708 | A1 | 3/2020 | Pattan et al. | |
| 2020/0104780 | A1 | 4/2020 | Sachdev et al. | |
| 2020/0233854 | A1 | 7/2020 | Kuchka et al. | |
| 2020/0236428 | A1 | 7/2020 | Li et al. | |
| 2021/0042796 | A1 | 2/2021 | Khoury et al. | |
| 2021/0049128 | A1* | 2/2021 | Kernick | G06V 40/161 |
| 2021/0065314 | A1 | 3/2021 | Storment et al. | |
| 2022/0198825 | A1 | 6/2022 | Reinisch et al. | |
| 2022/0261853 | A1 | 8/2022 | Publicover et al. | |
| 2022/0284324 | A1 | 9/2022 | Khalatian | |
| 2023/0059606 | A1 | 2/2023 | Lee et al. | |
| 2023/0120441 | A1 | 4/2023 | Hopkins et al. | |
| 2023/0122847 | A1 | 4/2023 | Benchetrit et al. | |
| 2023/0290177 | A1* | 9/2023 | Jacobs | G06F 16/51 |
| 2023/0409631 | A1 | 12/2023 | Futterman et al. | |
| 2024/0370943 | A1 | 11/2024 | Gulati et al. | |
| 2026/0094132 | A1 | 4/2026 | Sequino et al. | |
| 2026/0106914 | A1 | 4/2026 | Sequino et al. | |

OTHER PUBLICATIONS

International Search Report and Written Opinion issued in PCT/US24/43267 on Nov. 5, 2024; 13 pages.

"The dating app pictures that will get you the most right-swipes revealed" (Hoosie, Rachel; published Apr. 21, 2017, at https://www. theindependent.com/life-style/love-sex/dating-app-hinge-pictures-most-rig ht-swi pes-m enwo men-love-relationships-a 7694916. html) (Year: 2017).

Choosing Good Dating Profile Pictures with Helpful! (published online on Mar. 26, 2023, at https://helpfull.com/feedback-types/dating profile and retrieved using Internet Archive Wayback Machine on Sep. 3, 2025) (Year: 2023).

Tinder is A/B Testing your Face (Bhattacharya, Ananya; published online on Jul. 21, 2022 at https://qz.com/809681/tinders-machine-learning-algorithms-can-now-serve-your-most-appealing-photos-to-potential-dates) (Year: 2022).

USPTO Final Rejection in U.S. Appl. No. 18/903,553 dated Jan. 12, 2026, 23 pages.

Woolaston-Webber, "Tinder Smart Photos picks which image your matches will see", Business Oct. 13, 2016, p. 1-3, www.wired.com/story/tinder-smart-photos/ (Year: 2016).

Office Action from the US Patent and Trademark Office for U.S. Appl. No. 18/847,058 dated May 20, 2026 (29 pages).

Office Action from the US Patent and Trademark Office for U.S. Appl. No. 18/913,489 dated Jul. 6, 2026 (10 pages).

Final Office Action from the US Patent and Trademark Office for U.S. Appl. No. 18/847,058 dated Aug. 10, 2026 (30 pages).

* cited by examiner

FIG. 1G
9:41
Bretman 25
I like traveling, jokes, cooking, drinking, smoking, tattoos, cats, going to overpriced restaurants drinking, smoking, tattoos, cats, traveling, jokes.

APPARATUS FOR PHOTO SELECTION AND METHOD THEREOF

CROSS-REFERENCE TO RELATED APPLICATIONS

This application claims priority to Korean Patent Application No. 10-2023-0171545, filed Nov. 30, 2023, inventor Eunhyouk Shin et al., and is a continuation-in-part of U.S. patent application Ser. No. 18/847,058, filed Sep. 13, 2024, entitled, "SYSTEM AND METHOD FOR USER COMMUNICATION IN A NETWORK," which claims priority to International Patent Application No. PCT/US24/43267, filed Aug. 21, 2024, entitled, "SYSTEM AND METHOD FOR USER COMMUNICATION IN A NETWORK," which claims priority to U.S. Provisional Patent Application 63/534,087, filed 22 Aug. 2023, titled "System and Method for User Communication in a Network." The entire contents of all four of these applications are incorporated herein by reference.

TECHNICAL FIELD

This disclosure relates to information retrieval and, in particular, selection of images.

BACKGROUND

Online communities allow users a convenient platform to locate one another, post content, and communicate with one another. Some online communities match users with one another based on the mutual interests of the users (e.g., matching a job candidate to an employment opportunity, matching members in an online dating service). In the case of an online dating service, during a search for a potential dating match, a user may communicate with other users using various modes of communication.

In contemporary dating services like Tinder®, "liking" a user may be a crucial component to the service. Indeed, an important feature in a subscription plan might be unlocking a "who likes me" page. Users of dating services may subscribe to view those who have liked their profiles. To send a "like," another user may, for example, drag right on the user's profile. Another notable feature offered in subscription plans may include unlimited ability to "like" other users. To perceive value in this feature, users may be exposed to a significant number of potentially compatible profiles to "like." Furthermore, a match, or mutual "like" where both users "like" each other, can contribute to user retention. In summary, the "like" can be considered a vital action in the realm of dating services.

One of the key activities crucial to dating services may include effectively managing and curating an extensive collection of user profile photos that encourage "likes." By presenting a substantial number of high-quality images, the number of "likes" per user can potentially be increased, enhancing the user experience and overall satisfaction within the dating service ecosystem.

On the other hand, various methods can be employed to increase the number of high-quality photos more likely to receive "likes," such as photo enhancement, photo generation, and more. However, these methods focus exclusively on the aspect of curating user photos.

BRIEF SUMMARY

In a first implementation of the present disclosure, a method includes identifying an image stored on the computing device; obtaining a count of one or more faces of the image; and displaying the image on a display of the computing device, at least in part based on a determination whether the count of the one or more faces of the image exceeds a predetermined number and a determination whether the image is recent.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1A:
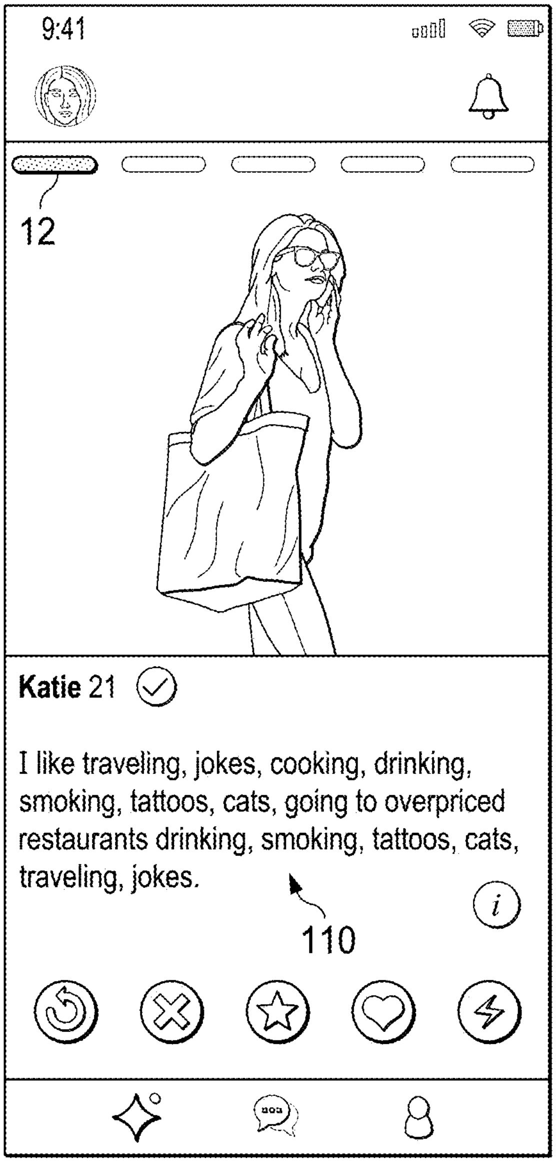
FIG. 1A illustrates an example of a first page of a profile of a target in an online community.

Generally, online dating service users have profiles that operate both as a "seeker" and as a "target." When a first user evaluates a profile of a second user and decides their interest in a match (e.g., by sending unfavorable feedback such as a "dislike" or favorable feedback such as a "like") with the second user, then the first user is operating as a "seeker," and the second user is operating as a "target." In many dating services, a match occurs when the first user expresses positive interest in the second user, and the second user then operates as a seeker in expressing positive interest in the profile of the first user, who is then acting as a target.

Existing dating services include a plurality of profiles, each profile corresponding to a user who can act as a seeker and as a target. Each profile includes one or more interests of the respective user. In a typical dating service, some users have expressed interest in some other users by sending favorable feedback.

Thus, the dating service has received, such as via a network interface, a variety of information from users. The information for each of the users can include, for example, a photograph of the respective user, an interest of the respective user, a boundary of the respective user, and a preference of the respective user. In addition, the information from a respective user can include an interest of the respective user in another user. Generally, the dating service receives several instances of this data for each user, as the user adds more information and sends more favorable feedback in an attempt to create a successful match.

The following foundational information can be viewed as a basis from which the present disclosure can be explained. Such information is offered for purposes of explanation only and, accordingly, should not be construed to limit the scope of the present disclosure and its potential applications.

Online dating services traditionally involved detailed profiles containing substantial information about their users. These detailed profiles became disfavored for several reasons, such as the lengthy onboarding process. For example, some dating services require such detailed information that it takes a user 20-45 minutes to complete a profile.

As a result, some dating services sought to reduce the onboarding process to as little as 30 seconds. To achieve this onboarding efficiency, the detail level for a complete, successful user profile was reduced to as little as a picture.

However, in this efficient paradigm, some users prefer a deeper level of matching, beyond the superficial attraction offered by a photo. For example, users might want to know about the interests (e.g., hobbies, causes, etc.) of another user. Conventionally, for a user to inform the dating service of his or her interests, the user typed out interests, leading to inconsistent identifications of the same hobby by different users. Alternatively, the user searches through a service-generated list to identify interests, increasing the onboarding process duration.

In addition, without the detailed information of a conventional profile, a picture becomes especially important to a profile in this efficient paradigm. A service seeking to achieve successful matching naturally would have an interest in users uploading the pictures that are most likely to achieve user success on the service.

In addition, in such online communities, users sometimes make matching decisions very quickly, such as within 1-2 seconds. Indeed, many users do not tap past the initial display of a target's profile. Therefore, the information shown on the initial display is the first and only opportunity for a target to prevent a seeker from making a permanent decision of declining to interact with the target any further.

Further, although a user of a conventional service usually can update their profile at an arbitrary time, the profile itself is static. That is, if two seekers view the profile of the target at the same time, then the service will display the same profile of the target to the two seekers. The interest level of the two seekers in the target can be heightened, if the dating service personalizes the target profile to each of the two seekers by displaying to the respective seeker the information about the target that the particular seeker is most likely to find relevant.

Users typically have an extensive collection of photos in their camera roll on their smartphone, making cumbersome the task of manually selecting images with a higher likelihood of receiving "likes". The camera roll may often contain a mix of personal and other people's pictures, along with numerous landscapes not suitable for a dating profile. Sorting and filtering these images by hand to identify those more likely to prompt "likes" can be a time-consuming and tedious process.

To potentially address these issues and others, various implementations of the present disclosure can implement a system and method for user communication in a network, as described herein.

A server in such an online community can display a user profile in the form of one or more pages. Each page can include one or more elements. Each element represents, for example, a field of content (e.g., biography, job title or description, educational institution) that can be rendered by an electronic device.

Figure 1B:
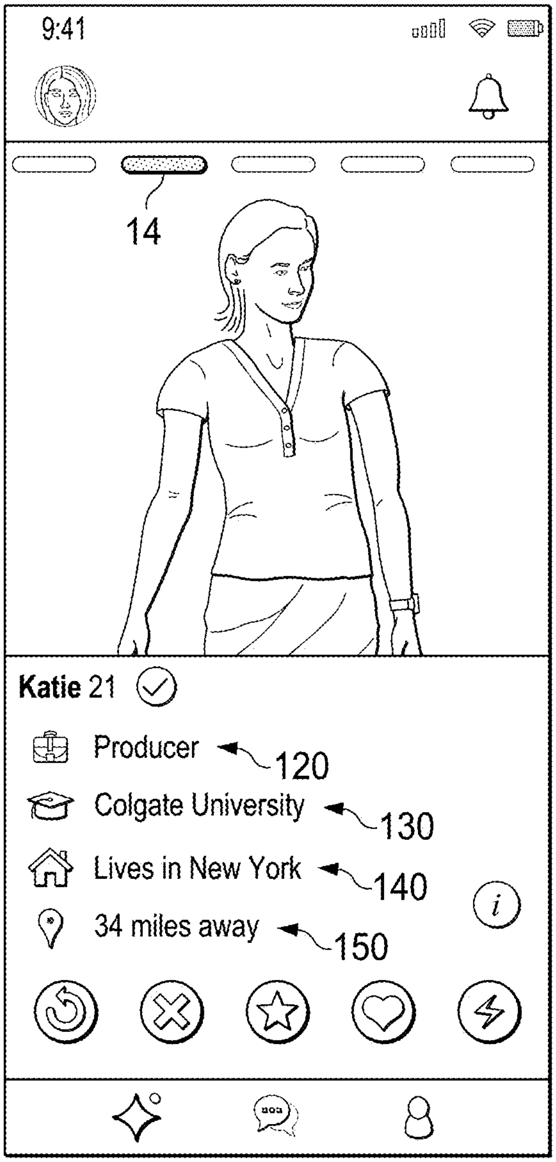
FIG. 1B illustrates an example of a second page of the profile of the target in the online community.
Figure 1C:
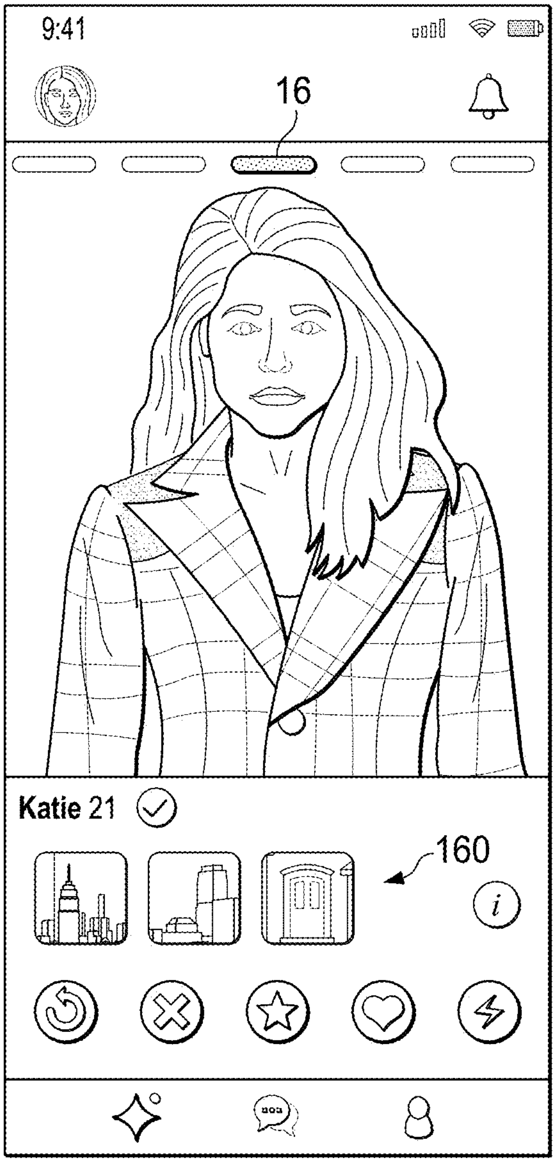
FIG. 1C illustrates an example of a third page of the profile of the target in the online community.

FIG. 1A illustrates an example of a first page of a profile of a target in an online community. FIG. 1B illustrates an example of a second page of the profile of the target in the online community. FIG. 1C illustrates an example of a third page of the profile of the target in the online community.

In particular, FIG. 1A includes a first index 12 indicating that the first page of five pages of the profile of user Katie is being displayed. The first page includes a first photograph and a biography 110 of the user Katie.

FIG. 1B includes a second index 14 indicating that the second page of the profile of user Katie is being displayed. The second page includes a first element 120, a second element 130, a third element 140, and a fourth element 150. The first element 120 indicates a job title or position of the user Katie. The second element 130 indicates a school attended by the user Katie. The third element 140 indicates a location of the user Katie. The fourth element 150 indicates a distance from the viewer (seeker) to the user Katie.

FIG. 1C includes a third index 16 indicating that the third page of the profile of user Katie is being displayed. The third page includes an element 160. The element 160 includes additional photographs. These photographs can be determined as discussed later in connection with FIG. 2 and/or FIG. 4.

An application program of the electronic device of a seeker can move between the pages of the profile of the user Katie. An application program is software that is executed on an electronic device for a specific purpose. Although not so limited, application programs are commonly downloaded from "app stores," such as the Apple App Store, Google Play, the Samsung Galaxy Store, and Valve Steam. Examples of online matching application programs include Tinder® by Tinder LLC and Hinge® by Hinge Inc., both owned by Match Group LLC. In some implementations, an application program is a web browser that executes code or a program at a specified network location, such as a web site. In such a situation, the code or program at the network location can be considered the application program, such as in the case of Match.com owned by Match Group LLC.

Further, the electronic device of the seeker is not limited to an electronic device owned by the seeker. Rather, the electronic device of a user is an electronic device into which the user can log into the online community. Thus, it is specifically contemplated that the electronic device of a user can be owned, leased, or furnished by someone else.

In some implementations, the application program can move between the pages, if the program does not receive a user input within a predetermined period of time (e.g., like a carousel). In other implementations, the application program can move between the pages, if the program receives a particular user input. For example, if the application program receives an input indicating right (e.g., a tap on the right side of a touchscreen, a press of a right arrow, dragging right, or other selection inputs), the application program can advance from the first page of the profile to the second page of the profile. On the other hand, if the application program receives an input indicating left (e.g., a tap on the left side of the touchscreen or a press of a left arrow, dragging right, or other selection inputs), the application program can return from the second page of the profile to the first page of the profile.

Conventionally, the order in which content in a target profile is displayed to a seeker is static. However, users sometimes base their perception of a profile based on which content they see first. Therefore, it can be advantageous if a matching community allows users to present their best attributes initially (e.g., on the very first page of the profile).

In various implementations of the present disclosure, a server can execute a dynamic content ordering algorithm to promote attributes (e.g., elements) of the profile of the target to the very first page of a display. A further implementation of the algorithm can personalize the ordering of the attributes based on the seeker's preferences.

Figure 1D:
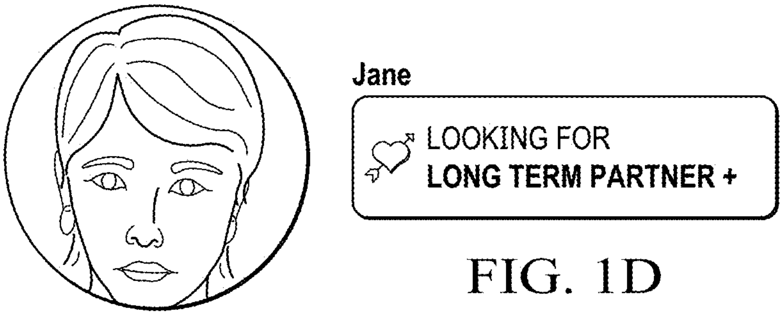
FIG. 1D illustrates an example of a portion of a profile of a seeker.
Figure 1E:
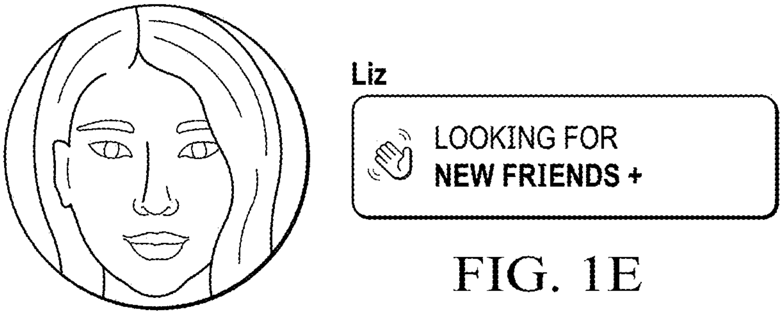
FIG. 1E illustrates an example of a portion of a profile of another seeker.

For example, the server can receive a preference from a user Jane indicating she is looking for a long-term partner. The server can also receive a preference from a user Liz indicating she is looking for new friends. Thus, FIG. 1D illustrates an example of a portion of a profile of a seeker, Jane. FIG. 1E illustrates an example of a portion of a profile of another seeker, Liz.

Thus, the server can prioritize display of different elements of a user Bretman's profile to seekers, based on the values of the elements. For example, the server can prioritize an element of Bretman's profile, if it matches (e.g., has a same or overlapping value) to a preference of Jane or Liz.

That is, the server can determine to prioritize an element to Jane by analyzing Jane's and Bretman's profiles. Similarly, the server can determine to prioritize an element to Liz by analyzing Liz's and Bretman's profiles. The server can transmit to each of Liz and Jane information to display a profile of Bretman.

The information can indicate an order in which to display the profile of Bretman to the respective recipient. For example, the information can include a flag that indicates a cohort to which the seeker (e.g., Jane or Liz) belongs.

Generally, a cohort is a group of users who share a defining characteristic in a particular context. For example, there can be cohorts defined based on a combination of a gender of a user and which genders the user is interested in. One such cohort might be women interested in women. Thus, a particular user is often a member of several cohorts, each in a different context. In the present example concerning Jane and Liz, the relevant cohort can be defined at least partly based on their individual relationship goal.

The information can itself follow a particular data structure including one or more fields. Each field can correspond to a particular element of the profile. Thus, for example, a first field can include the name of the target (e.g., "Bretman"), a second field can include an image of the target, a third field can include a biography of the target, a fourth field can include a relationship goal of the target, and so on.

The electronic device of the seeker who receives the information can display the content of a particular field in the first page of the profile. Other indications of the order are possible, as well.

Figure 1F:
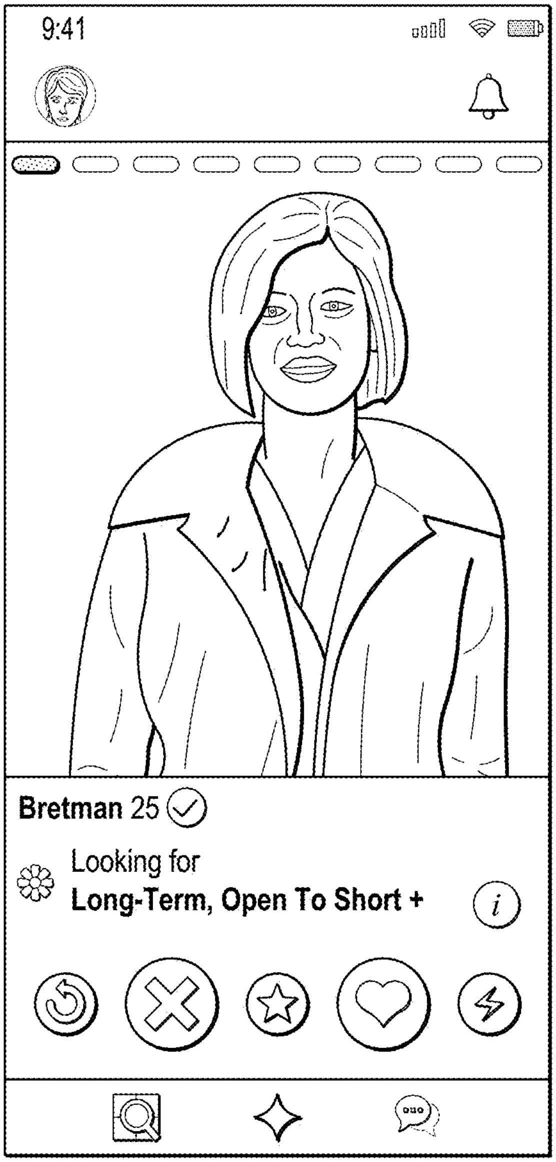
FIG. 1F is a first example of a first page of a profile of a user in accordance with an implementation of the present disclosure.

For example, if Bretman's relationship goal is "long-term, open to short," the server can determine that Bretman's relationship goal matches Jane's relationship goal of "long term partner." Thus, the server can cause the electronic device of Jane to display his profile as shown in FIG. 1F.

FIG. 1F is a first example of a first page of a profile of the user Bretman in accordance with an implementation of the present disclosure. As shown in FIG. 1F, when Jane is shown Bretman's profile, his relationship goal is displayed on the first page of his profile instead of his bio. Displaying a matching relationship goal on the first page of Bretman's profile is advantageous to creating the best first impression with Jane.

Further, because Bretman's relationship goal is "long-term, open to short," the server can determine that Bretman's relationship goal does not match Liz's relationship goal of "new friends." The server can determine that Bretman's relationship goal should not be prioritized to Liz. Thus, the server can cause the electronic device of Liz to display a first page of his profile, which includes Bretman's bio instead of his relationship goal.

Figure 1G:
FIG. 1G is a second example of a first page of a profile of a user Bretman in accordance with an implementation of the present disclosure.

Accordingly, FIG. 1G is a second example of a first page of the profile of the user Bretman in accordance with an implementation of the present disclosure. Because the relationship goals of Bretman and Liz do not match, Bretman's best first impression can be created with Liz by showing his bio on the first page of his profile.

Figure 1H:
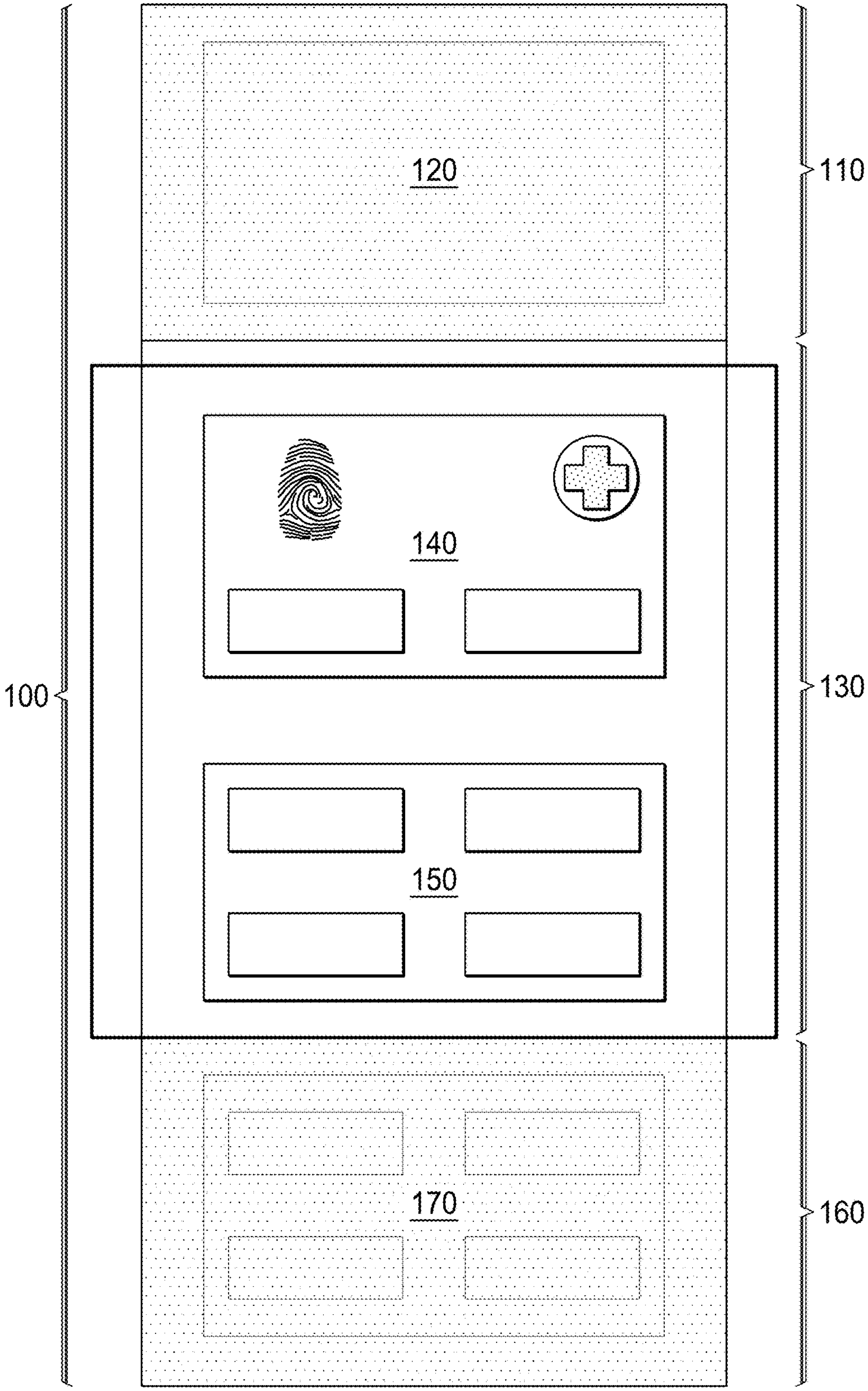
FIG. 1H illustrates an example of a profile in which the seeker moves through the pages in a continuous vertical manner, in accordance with an implementation of the present disclosure.

Briefly returning to FIGS. 1A-1C, the pages of the profile of the user Katie are perceived as being horizontal. That is, the seeker viewing the pages moves through the pages leftward or rightward. In contrast, FIG. 1H illustrates an example of a profile 100 in which the seeker moves through the pages in a continuous vertical manner, in accordance with an implementation of the present disclosure.

The profile 100 includes a first page 110, a second page 130, and a third page 160. In the implementation of FIG. 1H, a user can scroll vertically through the profile 100 on an electronic display device, such as a smartphone. FIG. 1H illustrates the profile 100 to show the device has scrolled past the first page 110, is currently displaying the second page 130, and has yet to scroll to the third page 160. Although FIG. 1H illustrates the first page 110, the second page 130, and the third page 160 as discrete portions, a skilled artisan would understand that the pages can be scrolled continuously and can be displayed as unitary. Thus, the application program of the electronic device can scroll smoothly, such that all or part of the first page 110 can be displayed simultaneously with all or part of the second page 130, depending on the size of the display and the size of the profile, for example. Similarly, all or part of the second page 130 can be displayed simultaneously with all or part of the third page 160, depending on the size of the display and the size of the profile, for example.

The first page 110 includes a photograph 120. The photograph can be determined as described later in connection with FIG. 2. The first page 110 can include one or more elements (not illustrated in FIG. 1H).

The second page 130 can include one or more groups of one or more elements, such as a first element portion 140 and a second element portion 150. As shown in FIG. 1H, the first element portion 140 includes a + (plus) icon and two elements (e.g., a job title, a geographic location, a distance, a traveling time, a relationship interest, a hobby, a cause, etc.). The second element portion 150 includes four elements. Generally, the content of the elements in the second element portion 150 differs from the content of the elements in the first element portion 140. In many implementations, the type (e.g., hobbies, causes, locations, etc.) of one or more elements in the second element portion 150 is the same as the type of one or more elements in the first element portion 140. In the example shown in FIG. 1H, the seeker has selected the first element portion 140 but not on the + icon, as illustrated by a fingerprint. The second page 130 can include one or more photographs (not illustrated in FIG. 1H).

The third page 160 includes an element portion 170. The element portion 170 also includes four elements (e.g., interests). As above, the elements of the element portion 170 generally differ in content, but necessarily type, from the elements in the first element portion 140 and/or the second element portion 150. The third page 160 also can include one or more photographs (not illustrated in FIG. 1H).

Figure 2:
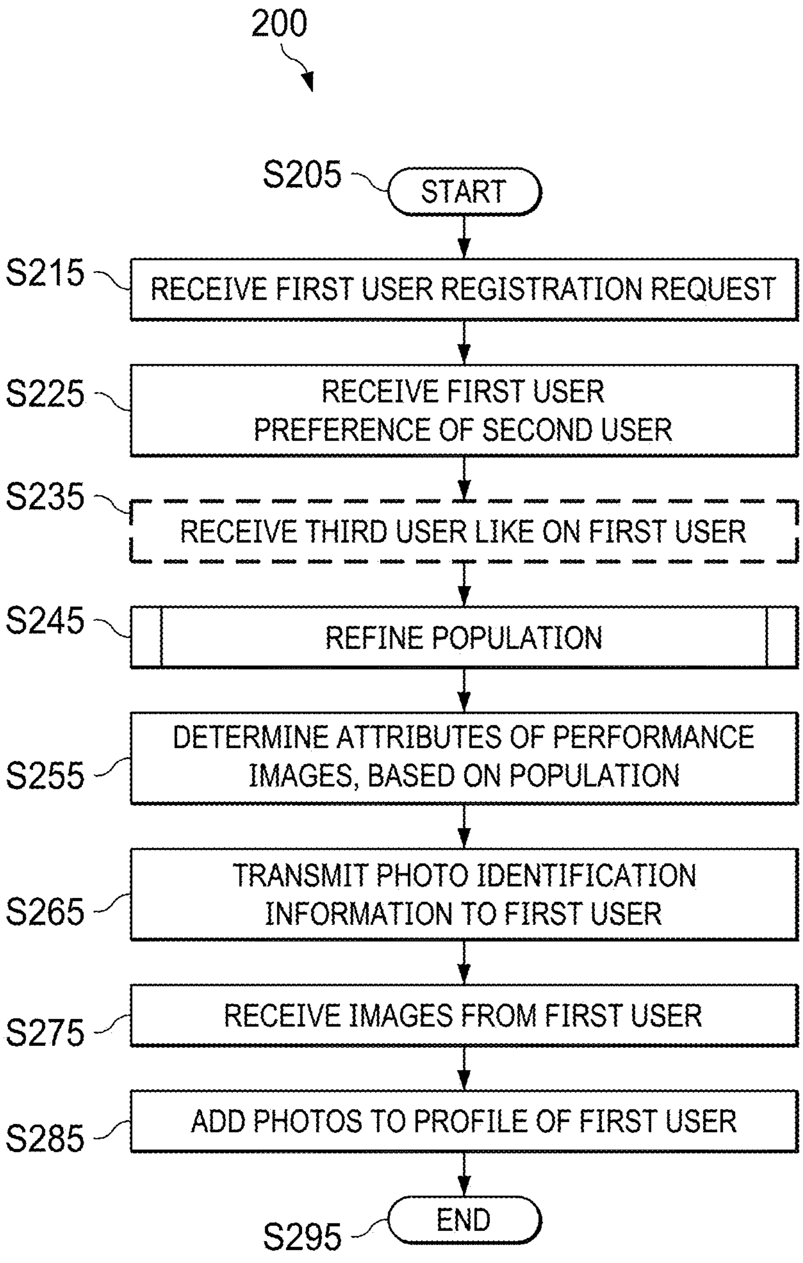
FIG. 2 illustrates an algorithm for recommending photographs to be added to a user's profile, in accordance with an implementation of the present disclosure.

In another implementation of the present disclosure, FIG. 2 illustrates an algorithm for recommending photographs to be added to a user's profile.

Servers can accumulate various data on high-performing profile photos. A "high-performing" profile photo is generally defined as the photo in a target's profile that receives the most "likes" when a seeker views the photo. In some implementations, a different definition is used, such as the photo in a target's profile that has the highest percentage of seekers that "like" the photo. Thus, various implementations of the present disclosure can identify a potentially high performing photo of the user that might increase the likelihood of matches.

Photo performance data relates to millions of existing photos, with thousands of more photos being uploaded every day. By human or machine analysis of that data, computer models can be constructed that indicate high-performing profile photos. Servers can also generate and/or be programmed with models to detect a user's face. Based on those models, when a user grants access to their photo library to an application program, that application program can detect their best potential profile photos. In various implementations, the server can select the photos arranged in a way to put together a cohesive profile showing a variety of interests.

In addition, the user's interests can be detected based on their local photo library or other photo repository that can be accessed by the user. Such a photo repository can be Drive® by Google LLC, iCloud® by Apple Inc., or Facebook® by Meta Platforms, Inc. The interests detected in those photos can be suggested to be added to the user's profile, or automatically added. These interests can then be displayed on the user's profile for seekers to see or can be used by the system in proposing targets.

The algorithm 200 begins at S205 and proceeds to S215.

In S215, a server receives a registration request from a first user, the registration request including a boundary of the first user. The boundary is, for example, a gender the first user is interested in being matched with, an age range with which the first user is interested in being matched with, a geographical distance within which the first user is seeking a match, etc. The registration request can also include a preference, such as, for example, hair color of a potential match.

Further, the registration request can include a photograph or video of the first user. In some such instances, the photograph or video is a verification video that can be used to determine whether the first user is who they claim to be. In select implementations, the registration request can include a voice recording of the user. In some such implementations, the server can generate a biometric fingerprint of the face of the first user, at least in part, based on the verification photograph or video of the first user. The server can use the biometric fingerprint to identify whether another photograph of a face shows the face of the first user or not. The biometric fingerprint can include detailed facial geometry, for example.

In some implementations, the server can receive a photograph or video of the first user to be included in a profile of the first user. In various implementations, the profile photograph or video can be the same or different from the verification photograph or video.

The algorithm 200 then advances to S225.

In S225, the server causes a profile of a second user to be displayed to the first user. For example, the server transmits the profile of the second user to an electronic device of the first user. The server then receives a preference from the first user as to the profile of the second user. The preference can be indicated by a dragging gesture, such as dragging in a particular direction, to demonstrate interest. The action can also be a tapping or clicking gesture, such as tapping on an icon that illustrates a heart, a thumbs-up, or the word "like," or other equivalents. The algorithm 200 then advances to optional S235.

In optional S235, the server receives an action from a third user on the portion of the profile of the first user. As before, the action can be a gesture, such as dragging, a tap or click on an icon, and so on. The algorithm 200 then advances to S245.

In S245, the server refines a population of users, based on basic information such as boundaries, preferences, and likes. S245 is discussed in more detail below in connection with FIG. 3. The algorithm 200 then advances to S255.

In S255, the server determines attributes of one or more performance images, explained below, at least in part based on the refined population. In an implementation in which the server received a like from the third user on the first user, the performance images can include the profile image of the first user. As discussed above, this determination can be based on data accumulated by the server on high-performing photographs that typically result in more "likes" of profiles. The server can determine the attributes via deterministic programming and/or machine learning (also called artificial intelligence or "AI"). For example, the attributes can identify a face of a user, natural but indirect lighting, a crisp photograph (e.g., a photo in which the details are clear and distinct), or a smile of a user. The attributes can identify disinclinations, as well. For example, the attributes can indicate a preference for fewer, rather than more, faces in an image, or a preference against a blurry photo. Further, the attributes can indicate a preference for a pose of the subject, other than standing, sitting, or lying, for instance. The algorithm 200 then advances to S265.

In S265, the server transmits photo identification information to an electronic device of the first user. The photo identification information includes and/or identifies the attributes of the one or more performance images. The photo identification information can also include the verification video or photograph of the first user and/or the biometric fingerprint of the first user.

The electronic device can then select images of the first user that are more likely to perform well among people likely to be interested in the first user. This selection is discussed in more detail below, in connection with FIG. 4. The algorithm 200 then advances to S275.

In S275, the server receives images uploaded from an electronic device of the first user via an application program, for example. The algorithm 200 then advances to S285.

In S285, the server adds the images to a profile of the first user. In some implementations, the server can recognize interests of the first user indicated by the images. For example, if the server recognizes a football in an image, then the first user might have an interest in football. The algorithm 200 then advances to S295, in which the algorithm 200 concludes.

Figure 3:
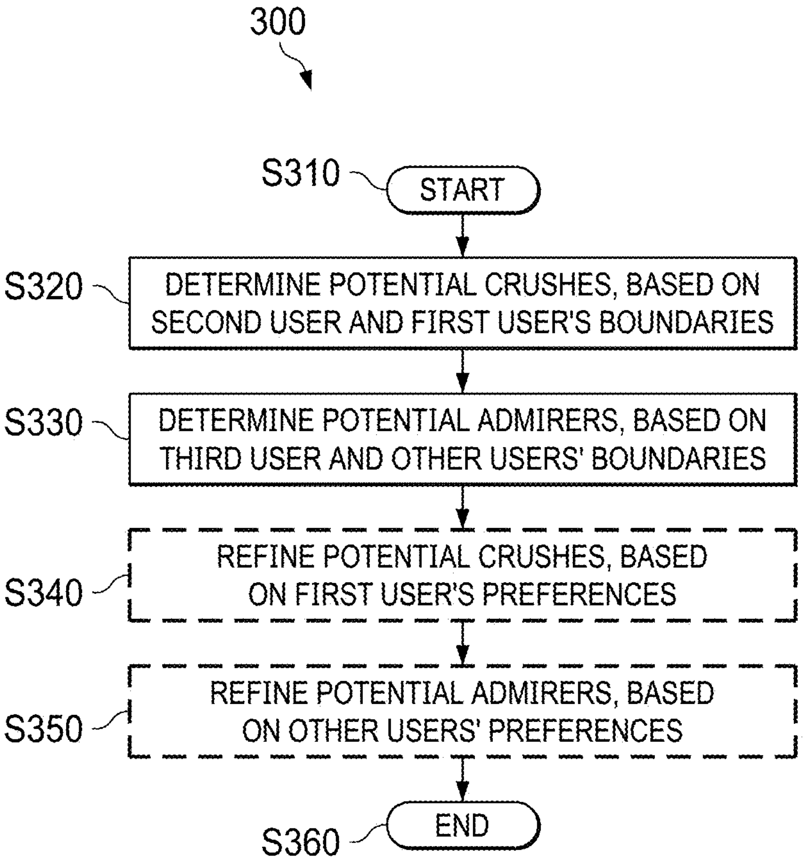
FIG. 3 illustrates an algorithm for refining a population, based on basic information, in accordance with an implementation of the present disclosure.

FIG. 3 illustrates an algorithm 300 for refining a population, based on basic information, in accordance with an implementation of the present disclosure.

The algorithm 300 begins at S310 and advances to S320 in which the server determines a potential crush of the first user, at least in part based on the profile of the second user liked in S225 and the boundary of the first user. Thus, the population from whom the performance photos are determined can be limited to those users in whom the first user is likely to be interested. The algorithm 300 then advances to S330.

In S330, the server determines potential admirers of the first user, at least in part based on the profile of the third user and boundaries of the potential admirers. Thus, the population from whom the performance photos are determined can be limited to those users who are likely to be interested in the first user. The algorithm 300 then advances to S340.

In S340, the server optionally refines the potential crushes of the first user, at least in part based on the first user's preferences. Thus, the population from whom the performance photos are determined can be limited to those users whom the first user is more likely to be interested in. The algorithm 300 then advances to S350.

In S350, the server optionally refines the potential admirers, based on preferences of the potential admirers. Thus, the population from whom the performance photos are determined can be limited to those users who are more likely to be interested in the first user.

The algorithm 300 then advances to S360 and concludes.

Figure 4:
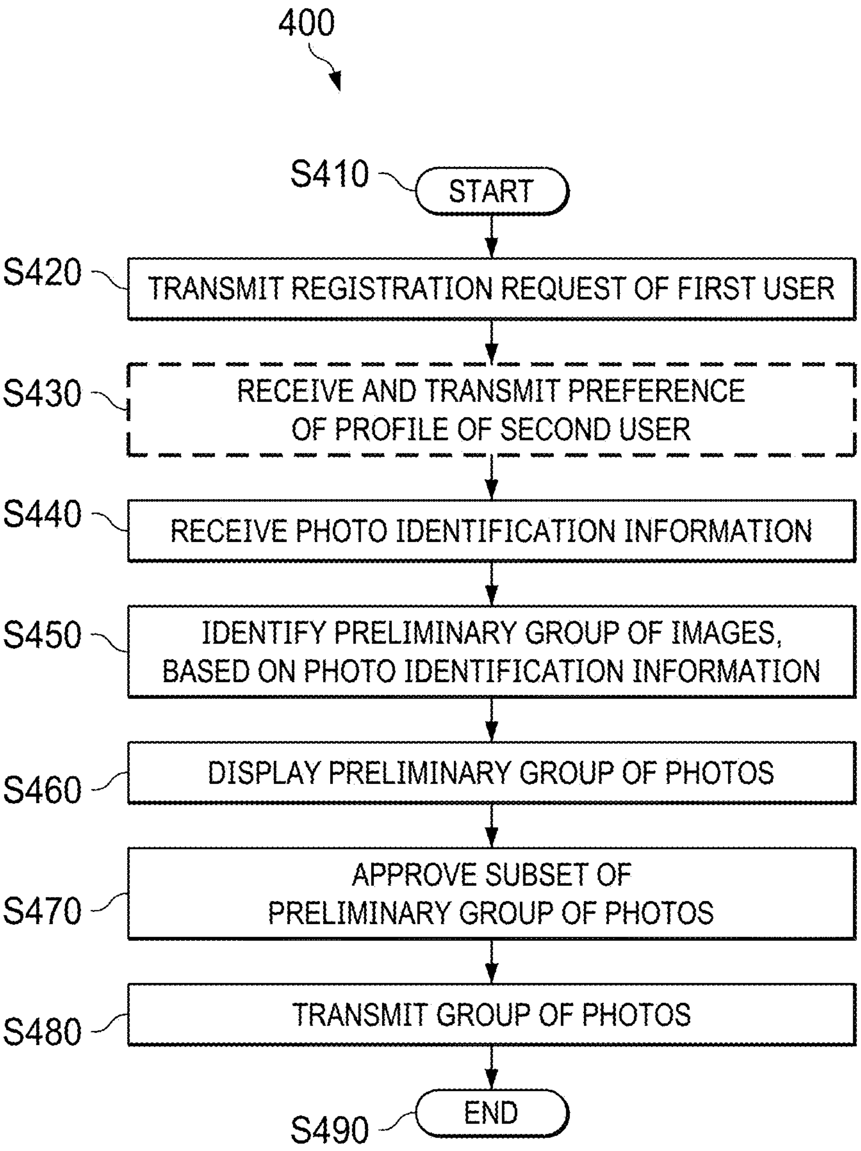
FIG. 4 illustrates an algorithm for selecting images of a user that are more likely to perform well among people likely to be interested in the user, in accordance with an implementation of the present disclosure.

FIG. 4 illustrates an algorithm 400 for selecting images of a user that are more likely to perform well among people likely to be interested in the user, in accordance with an implementation of the present disclosure.

The algorithm 400 begins at S410 and advances to S420 in which the electronic device transmits a registration request of the first user to a server. As discussed previously, the registration request can include a boundary of the first user, a preference of the first user, a verification photograph or video of the first user, and/or a profile photograph or video of the first user. The algorithm 400 then advances to S430.

In optional S430, the server can transmit the profile of a second user to the electronic device of the first user, and the electronic device can output (e.g., display) the profile of the second user. The first user can then indicate their preference in the profile of the second user, such as by an action of "liking" the profile. The electronic device can transmit an indication of this preference to the server. The algorithm 400 then advances to S440.

In S440, the electronic device receives the photo identification information including the performance image information. The performance image information can indicate images that perform in a particular manner in on-line matching, such as high-performing images. For example, a picture of a man holding a fish might be known to not perform well. However, a picture of a shirtless man might be known to perform well. The photo identification information can include a biometric fingerprint of the face of the first user.

Thus, in some implementations, the server can determine the photo identification information at least in part based on the action, relative to the profile of the second user. Thus, some implementations of the algorithm 400 can select photos of the first user that are more likely to be successful with users in whom the first user is likely to have interest based on the photo identification information. The algorithm 400 then advances to S450.

In S450, the electronic device identifies a preliminary group of images of the first user, at least in part based on the performance image information. In doing so, an application program of the electronic device can access images and/or videos in the electronic device's camera roll. The camera roll is a common feature in smartphones, for example. In some implementations, the software on the electronic device can access all images locally stored in the electronic device, such as images downloaded from a social media application program. In an advanced implementation, the electronic device can, via a network interface, access images and/or videos "on the cloud."

In some implementations, the electronic device merely scans the images in the camera roll, or a user-selected set of photos, for faces. In other implementations, the electronic device identifies the preliminary group of images, at least in part based on the biometric fingerprint, to differentiate photographs of the face of the first user from photographs of other people. In such an implementation, the photo identification information can include expected face attributes (e.g., eye distances or nose shapes). The algorithm 400 then advances to S460.

In many implementations, the camera roll might include hundreds of photographs. It would be burdensome to expect the first user to scroll through all of these photographs to determine which are likely to perform well to garner the most "likes" and, further, the user may not be aware what photos will perform well. Accordingly, in S460, the electronic device displays the preliminary group of images to the first user. Thus, the electronic device can visually identify those photographs that include a face, satisfy the performance image information, and optionally meet the biometric fingerprint of the first user.

For example, the electronic device can display all photos including a face and place a colored border around those photos that satisfy the performance image information. In another example, the electronic device displays a predetermined number (e.g., 36) of photos including a face that meets the biometric fingerprint of the first user and that best satisfy the performance image information (e.g., are scored highest based on criteria in the performance image information). The electronic device then places a differently colored border around the top 6 of these 36 photos. Of course, other implementations are possible. The algorithm 400 then advances to S470.

In S470, the first user approves a group of photos. In some implementations, the group is a subset of the preliminary group of photos. For example, the first user can approve the top 6 of 36 displayed photos. The first user can also exclude one or more of the preliminary group photos from the group of photos. Thus, the electronic device can maintain aspects of the first user's privacy. Further, the first user can include other photos in the group, whether these photos are part of the preliminary group or not. The algorithm 400 then advances to S480.

In S480, the electronic device transmits the approved group of images to the server, for example. The algorithm 400 then advances to S490 and concludes.

In S450, the identification of the preliminary group of images can be enhanced, based on previous input by the first user. For example, the photo identification information can indicate that a full-body photo might perform well. Nevertheless, the first user might have excluded one or more full-body photos of themself in a previous execution of S470. Accordingly, the electronic device can exclude a different full-body photo of the first user in the next preliminary group of images.

Equally, the first user might have often included a picture of the first user holding a fish in a previous execution of S470. Such a picture might not be expected to perform well. Nevertheless, the electronic device can include a picture of the first user holding a fish in the next preliminary group of images.

To maintain user privacy, the machine-learning allowing for these inclusions and/or exclusions can be performed at the electronic device of the user. In implementations in which the machine-learning is performed at the server, the information allowing for these inclusions and/or exclusions can be included in the photo identification information, for example.

Figure 5:
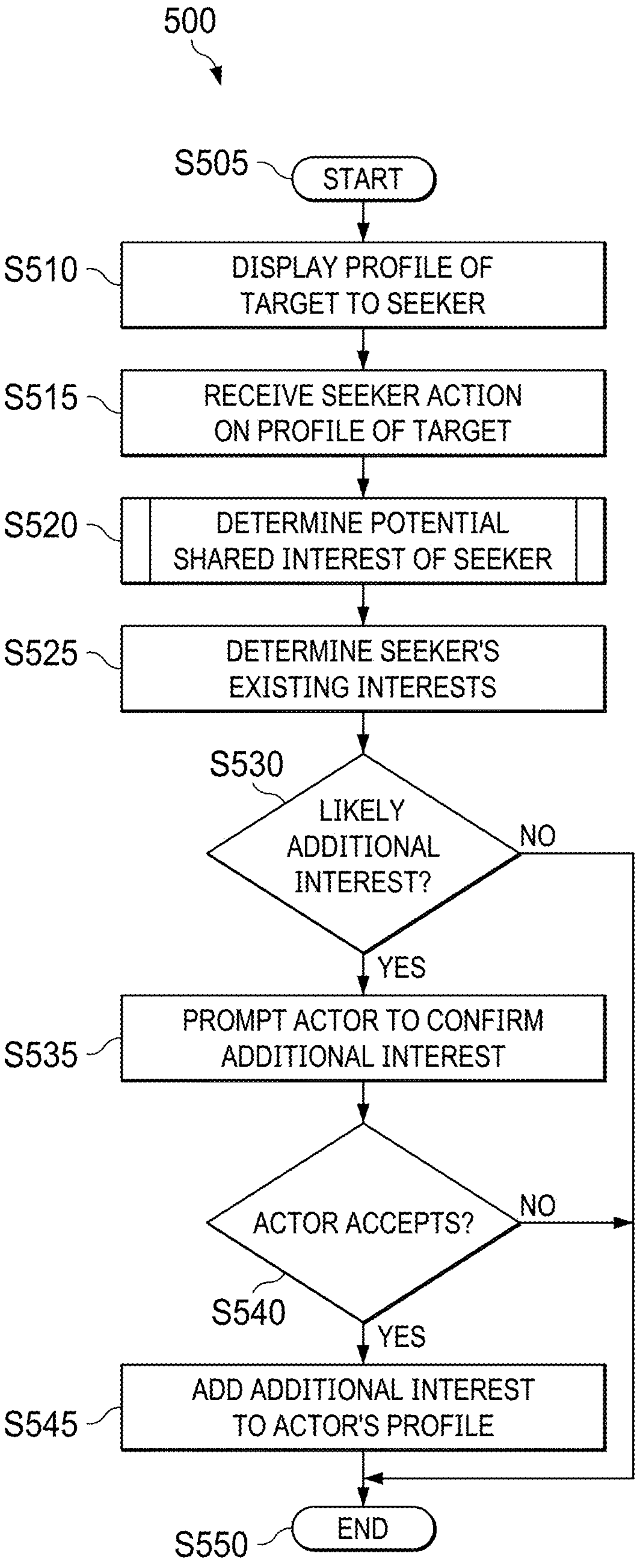
FIG. 5 illustrates an algorithm for adding interests to a user's profile in accordance with an implementation of the present disclosure.

Further, the algorithms 200, 300, and 400 generally relate to selecting images for the profile of a user. In many implementations, other media can be selected instead of or in addition to images. For example, this media can be video in any video format (e.g., MP4, AVI, WMV, MOV, etc.), still and/or animated files in Graphics Interchange Format (GIF) format, and/or augmented reality (AR) or virtual reality (VR) formats. In another implementation of the present disclosure, FIG. 5 illustrates an algorithm 500 for adding interests to a user's profile.

Adding interests to a user's profile can be a burdensome part of the onboarding process. Some implementations of the algorithm 500 allow for interests to be added to a user's profile while the user primarily is viewing profiles and indicating preferences on other users, rather than completing the onboarding process.

The algorithm 500 begins at S505 and advances to S510.

In S510, the server displays a profile of a target to a seeker. For example, the server transmits the profile of the target to an electronic device of the seeker. The profile can look like the profile illustrated in FIG. 1H, for example. The algorithm 500 then advances to S515.

In S515, the server receives an action from an electronic device of the seeker on the profile of the target. The action can be, for example, a "like." The algorithm 500 then advances to S520.

In S520, the server determines a potential shared interest of the seeker, at least in part based on an interest in the profile of the target. This determination is discussed in more detail below in connection with FIG. 6. The algorithm 500 then advances to S525.

In S525, the server determines an existing interest from the profile of the seeker. The algorithm 500 then advances to S530.

In S530, the server determines whether the potential interest likely is an additional interest of the seeker. For example, the server determines whether the seeker's interests already include the potential interest, such that the potential interest is not an additional interest.

In some implementations, the seeker's interests might include an interest that suggests the seeker is unlikely to share the potential interest, at least relative to other interests of the target. For example, if the seeker has an interest in one soccer team, then the seeker is unlikely to share a potential interest of a different soccer team in the same league.

In many implementations, if the potential interest is not an additional interest, the server can select another interest of the target as a potential interest and repeat S530. For example, if the server determines the seeker touched the second element portion 150, the server can select a different interest in the second element portion 150 as a potential interest.

If the server determines no potential interest is an additional interest of the seeker (or, in some implementations, that the potential interest likely is not an additional interest of the seeker), then the algorithm 500 advances to S550.

If the server determines the potential interest likely is an additional interest of the seeker, then the algorithm 500 then advances to S535.

In S535, the server prompts the seeker to confirm the additional interest. For example, the server can transmit data indicating the additional interest to the electronic device of the seeker, and the electronic device can display a prompt, based on the additional interest. The electronic device can receive a confirmation or rejection of the additional interest from the seeker. The electronic device can optionally transmit an indication of the confirmation or rejection to the server.

In S540, the server determines whether the seeker confirmed the addition of the additional interest as an interest (e.g., accepted the prompt). For example, the determination can be based on receiving an indication of the confirmation or rejection of the additional interest. If the server determines the seeker did accept the addition of the additional interest, the algorithm 500 advances to S545.

In S545, the server adds the additional interest to the profile of the seeker. The algorithm 500 then advances to S550.

Returning to S540, if the server determines the seeker did not accept the addition of the additional interest, the algorithm 500 advances to S550. Thus, the server can respect the autonomy of the seeker in selecting their own interests.

In S550, the algorithm 500 concludes.

Figure 6:
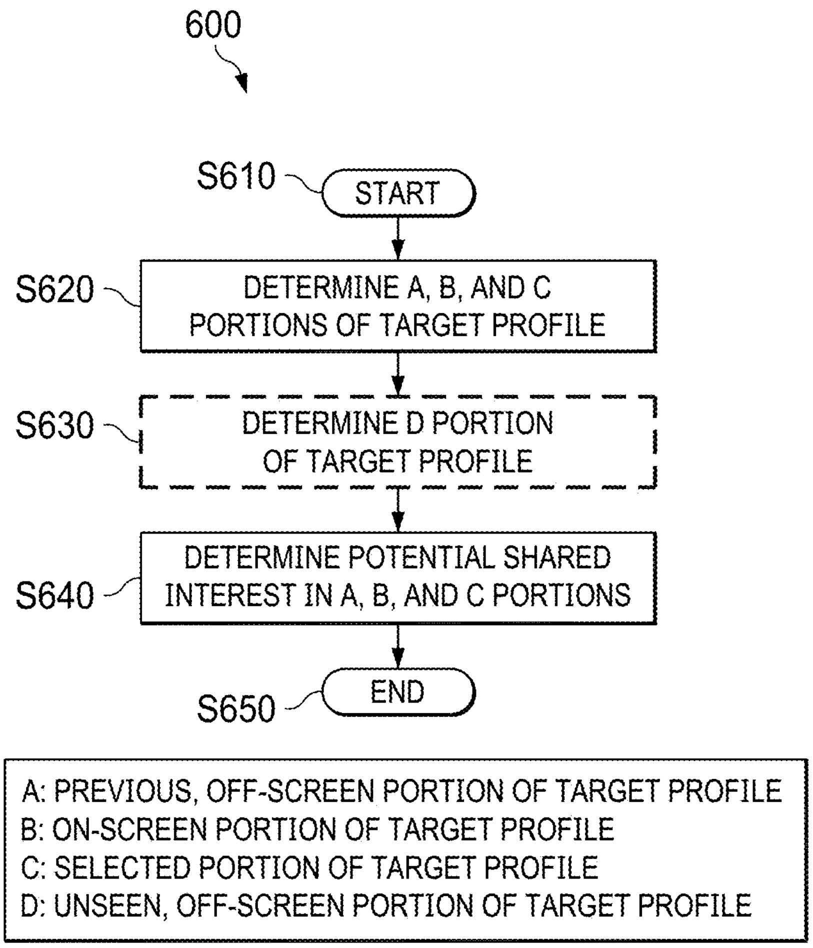
FIG. 6 illustrates an algorithm for determining a potential shared interest of a seeker, based on an interest of a target, in accordance with an implementation of the present disclosure.

FIG. 6 illustrates an algorithm 600 for determining a potential shared interest of a seeker, based on an interest of a target, in accordance with an implementation of the present disclosure. In many implementations, this determination is performed based on the seeker liking the target or a portion of the target's profile.

If the seeker performs a selection on a portion of the profile of the target (such as by selecting the first element portion 140 or, more clearly, selecting the + icon in the first element portion 140), then there is substantial confidence that the seeker intends to designate an interest in the first element portion 140 as a shared interest. Thus, the server can determine the potential interest, based on such a seeker selection.

In some implementations, the server can infer the seeker's interest in a displayed portion of the profile. For example, the seeker might spend more time looking at a travel photo (e.g., by not continuing to scroll the second portion 130 along the profile 100), and the server can infer this additional time indicates the seeker's interest in travel or the pictured location. The interest in the location can be identified using a geotag, a hashtag, or image recognition, for example. Thus, the server can infer this interest in the displayed portion, even if the seeker does not tap in the displayed portion.

Further, the server can infer that the seeker is not averse to an interest in the previous, off-screen portion of the profile of the target, because the seeker continues to view the profile of the target. Thus, an interest in the previous, off-screen portion of the profile can be a potential shared interest. Suggesting such an interest can be particularly valuable, when the profile of the seeker includes few interests (e.g., the seeker is new to the service) and/or when there are few other options for potential shared interests (e.g., there are few being displayed or those interests being displayed are either existing shared interests or unlikely shared interests).

Thus, to potentially achieve these benefits, the algorithm 600 begins in S610 and advances to S620.

In S620, the server determines a previous, off-screen portion of the profile of the target. Because the second page 130 is currently being displayed on an electronic device in the example of FIG. 1H, the first page 110 is an example of a previous, off-screen portion. In addition or alternatively, the server determines a portion of the profile of the target that is currently displayed to the seeker on the electronic device. For example, this portion can be a portion of the profile that was most recently transmitted to the electronic device. Thus, the second element portion 150 of the second page 130 in FIG. 1H is an example of an on-screen portion of the profile of the target. In addition or alternatively, the server determines a selected portion of the profile of the target. The selected portion can be a portion of the profile displayed on the electronic device and selected by the seeker. The first element portion 140 of the second page 130 in FIG. 1H is an example of a selected portion of the profile of the target. The algorithm 600 then advances to S630.

In optional S630, the server determines an unseen, off-screen portion of the profile of the target. The third page 160 in FIG. 1 is an example of an unseen, off-screen portion of the profile of the target. For example, the server can determine a portion of the profile that has not yet been requested by or transmitted to the electronic device. The algorithm 600 then advances to S640.

In S640, the server determines a potential interest of the seeker, based on the interests in the previous, off-screen portion, the on-screen portion, and/or the selected portion of the profile of the target. That is, in many implementations, the server does not determine the potential interest of the seeker, based on the unseen, off-screen portion of the profile, because an interest only in that portion could not have influenced the seeker.

In some implementations, the server can determine the potential shared interest by performing image recognition on an image in the previous, off-screen portion, the on-screen portion, or the selected portion of the target profile.

The algorithm 600 advances to S650 and concludes.

Figure 7A:
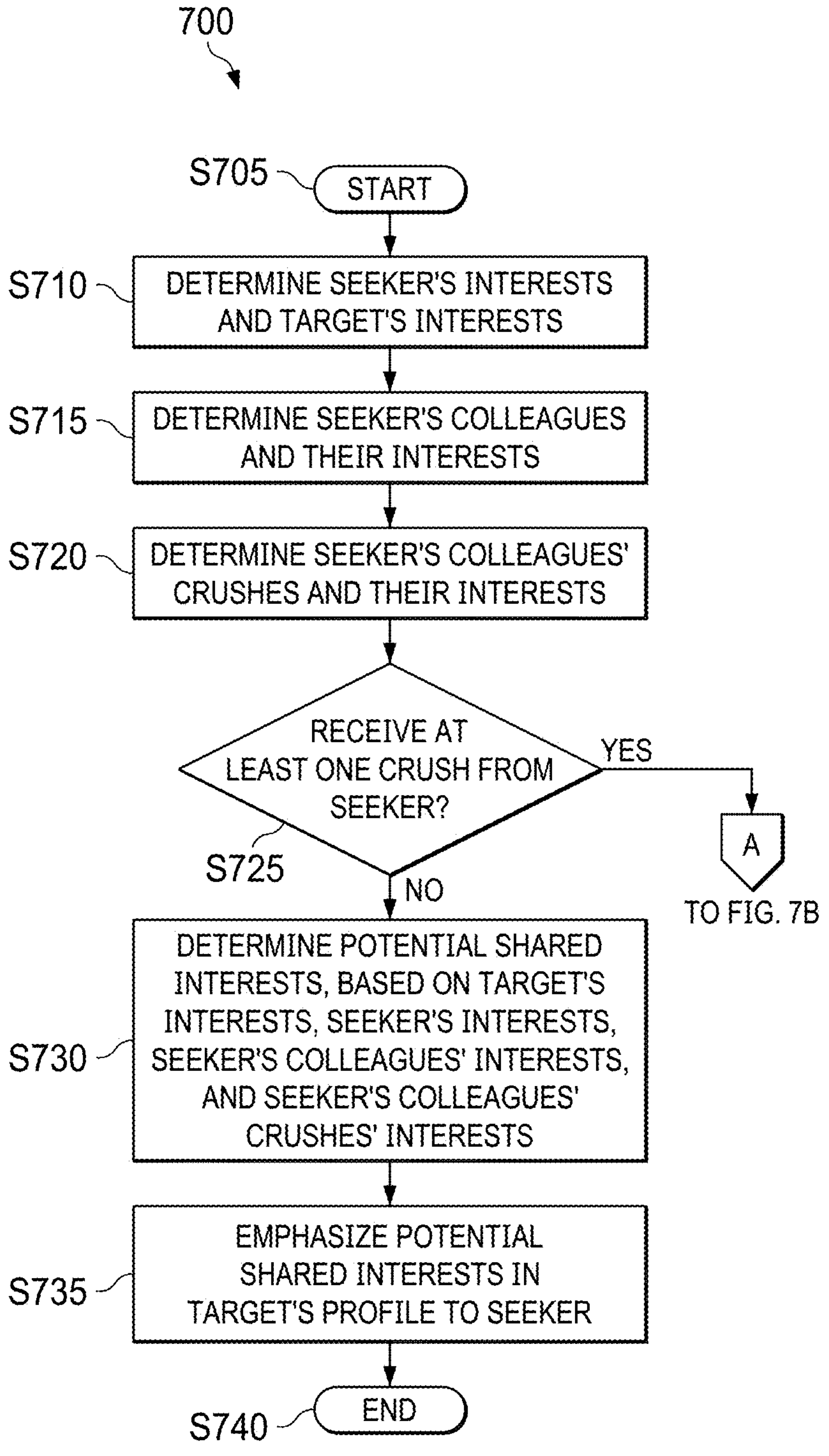
FIG. 7A illustrates a first portion of an algorithm for determining an interest of a target to be emphasized to a seeker, in accordance with an implementation of the present disclosure.

In another implementation of the present disclosure, FIG. 7A illustrates a first portion of an algorithm 700 for determining an interest of a target to be emphasized in a profile to a seeker. Such an algorithm can be implemented with machine learning to adapt the display of the profile of the target, based on the seeker's interests or preferences. That is, the algorithm can determine what aspects of the target the seeker is likely to "like."

In many implementations of the algorithm 700, the server has received a profile of the seeker, and the profile indicates an interest of the seeker. Further, the server has determined a target to be suggested to the seeker, based on any criteria (e.g., the target fulfills a preference of the seeker, the target paid to have their profile promoted, etc.).

Generally, a matching service can divide its population into cohorts, based on interests, "liking" similar people, being "liked" by similar people, and so on. Each of the cohorts to which a user belongs can inform which aspects a user might "like" in a target.

For example, a seeker might have an interest in running. Other users with an interest in running have an interest in beer. Therefore, the seeker might have an interest in beer. So, the server can emphasize the target's interest in beer to the seeker.

Further, additional information can be gleaned by considering the interests of people liked by other members of the cohort. For example, runners might "like" users with an interest in swimming. Therefore, the server can emphasize the target's interest in swimming to the seeker.

The chaining could continue with the server considering what interests other swimmers have, as an example. However, at some point, the value of the information decreases, especially as resource (e.g., processing time, memory, etc.) consumption increases. Thus, some implementations limit the amount of chaining performed, though not necessarily at the point listed above.

The algorithm 700 begins at S705 and advances to S710.

In S710, the server determines one or more interests of the seeker and one or more interests of the target. The algorithm 700 then advances to S715.

In S715, the server determines other users (e.g., "colleagues") who share one or more interests with the seeker. This determination can be based on an interest of the seeker and an interest of the respective other users, for example. The server then determines other interests of those colleagues. The algorithm 700 then advances to S720.

In S720, the server determines other users (e.g., "crushes") whom the seeker's colleagues have "liked." For example, the server can determine whether favorable feedback has been received from the seeker's colleagues regarding a profile of a crush. The server then determines interests of these crushes. The algorithm 700 then advances to S725.

In S725, the server determines whether favorable feedback (e.g., at least one "like") of another target has been received from the seeker (e.g., the other target is a crush of the seeker). If the server determines favorable feedback of another target has been received from the seeker, then the algorithm 700 advances to off-page connector A, discussed in connection with FIG. 7B.

If the server determines favorable feedback of another target has not been received from the seeker, then the algorithm 700 advances to S730.

In S730, the server determines shared interests between the seeker and the target, at least in part based on the seeker's interest, the target's interest, the seeker's colleagues' interests, and the seeker's colleagues' crushes' interests. The algorithm 700 then advances to S735.

In S735, the server emphasizes to the seeker one, some, or all of the determined interests in the profile of the target. For example, the server can transmit data to an electronic device of the seeker to cause a display of text indicating these interests in a bold or a larger typeface or with a colored border. In some implementations, the server can transmit data to an electronic device of the seeker to cause a display these determined interests (possibly, exclusively) and not display other interests. Thus, the server can emphasize interests of the seeker, of the target, of people with interests of the seeker, and of those people liked by the people with the seeker's interests. The algorithm 700 then advances to S780 and concludes.

Figure 7B:
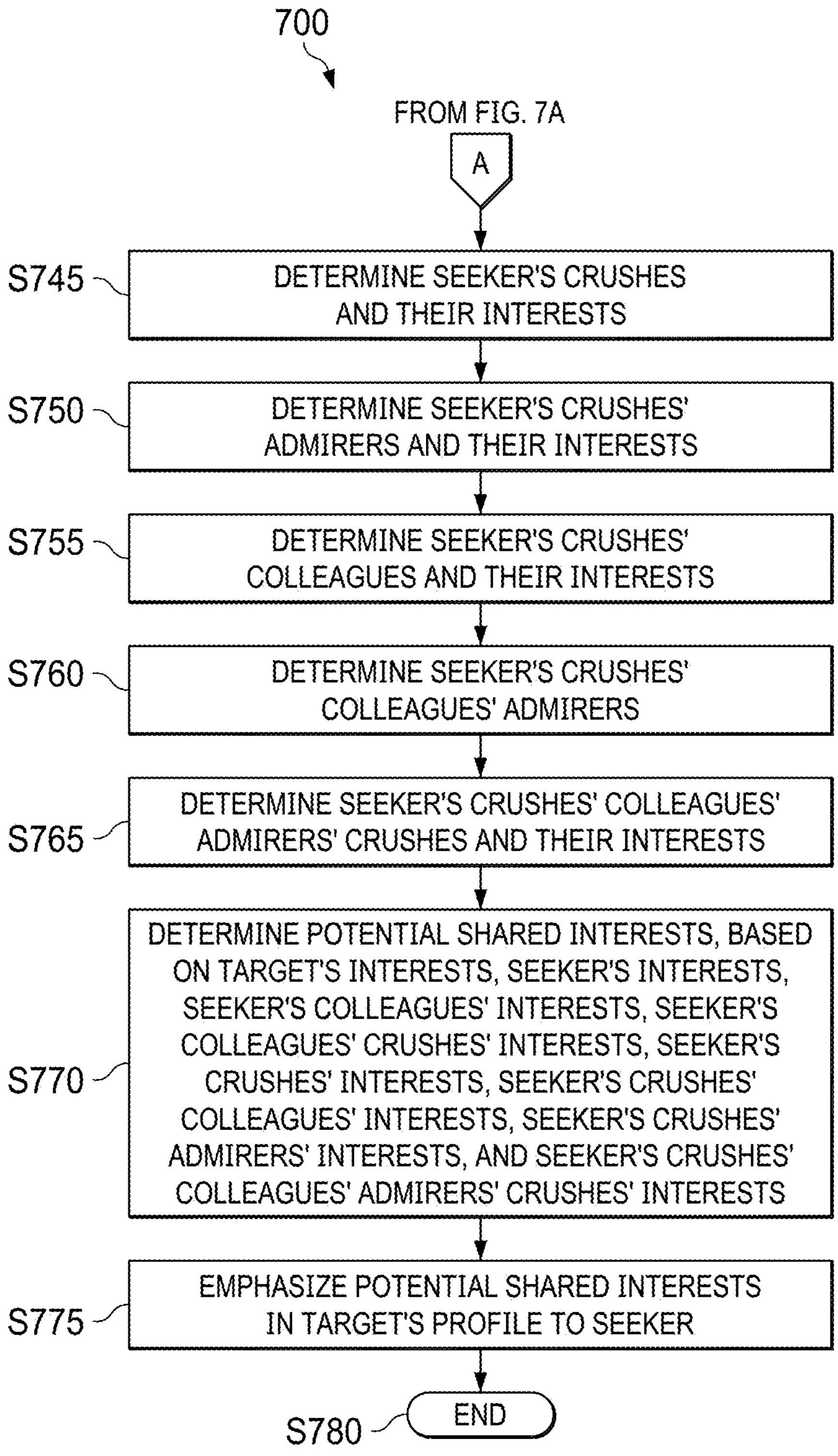
FIG. 7B illustrates a second portion of an algorithm for determining an interest of a target to be emphasized to a seeker, when considering a "like" of the seeker, in accordance with an implementation of the present disclosure.

FIG. 7B illustrates a second portion of the algorithm 700 for determining an interest of a target to be emphasized to the seeker, when considering a "like" of the seeker, in accordance with an implementation of the present disclosure.

FIG. 7B begins at the off-screen connector A from FIG. 7A. The algorithm 700 then proceeds to S745.

In S745, the server determines one or more users who are crushes of the seeker, based on favorable feedback (e.g., one or more "likes") received by the server from the seeker for the profiles of those users. The server then determines interests of the crush(es) of the seeker. Thus, the server later can determine whether to emphasize a particular interest of the target to the seeker, because the seeker likes people who have that interest. The algorithm 700 then advances to S750.

In S750, the server determines users ("admirers") who have "liked" profiles of the crushes of the seeker. For example, the server can determine whether favorable feedback has been received from an admirer regarding profiles of the crushes of the seeker. The server also determines the interests of these admirers.

That is, the server determines the seeker is a member of a cohort of people with particular crushes. The server can then consider the interests of people who have those crushes. Thus, the server later can determine to emphasize a particular interest of the target to the seeker, because the seeker is a type of person interested in that crush and that is likely to have that particular interest. The algorithm 700 then advances to S755.

In S755, the server determines the colleagues of the seeker's crushes, based on a shared interest between the colleagues and the seeker's crushes. That is, the server can determine the seeker is member that likes a cohort of targets with particular interests. The server also determines the interests of these colleagues. Thus, the server later can determine to emphasize a particular interest of the target to the seeker, because the seeker "likes" a type of users who have that particular interest. The algorithm 700 then advances to S760.

In S760, the server determines the admirers of the colleagues of the seeker's crushes. In many implementations, the server does not necessarily determine the interests of these admirers, as the likelihood of the seeker being interested in those interests is tenuous. For example, the seeker is less likely to share an interest with a person, simply because that person likes someone with a shared interest of the seeker's crush. The algorithm 700 then advances to S765.

In S765, the server determines the crushes of the admirers of the colleagues of the seeker's crushes. In addition, the server can determine the interests of these crushes. Thus, the server later can determine to emphasize a particular interest of the target to the seeker, because people with shared interests to a person "liked" by the seeker are "liked" by people who also "like" other people with that particular interest. The algorithm 700 then advances to S770.

In S770, the server determines the potential shared interests between the seeker and the target, based on the previously determined interests (e.g., the target's interests, the seeker's interests, the seeker's colleagues' interests, the seeker's colleagues' crushes' interests, the seeker's crushes' interests, the seeker's crushes' colleagues' interests, and the seeker's crushes' colleagues' admirers' crushes' interests). In select implementations, the potential shared interests can additionally or alternatively be based on the seeker's crushes' admirers' interests. The algorithm 700 then advances to S775.

In S775, the server emphasizes the potential shared interests in the target's profile to the seeker, such as with a bold typeface or border, as discussed above.

The algorithm 700 then advances to S780 and concludes.

Figure 8:
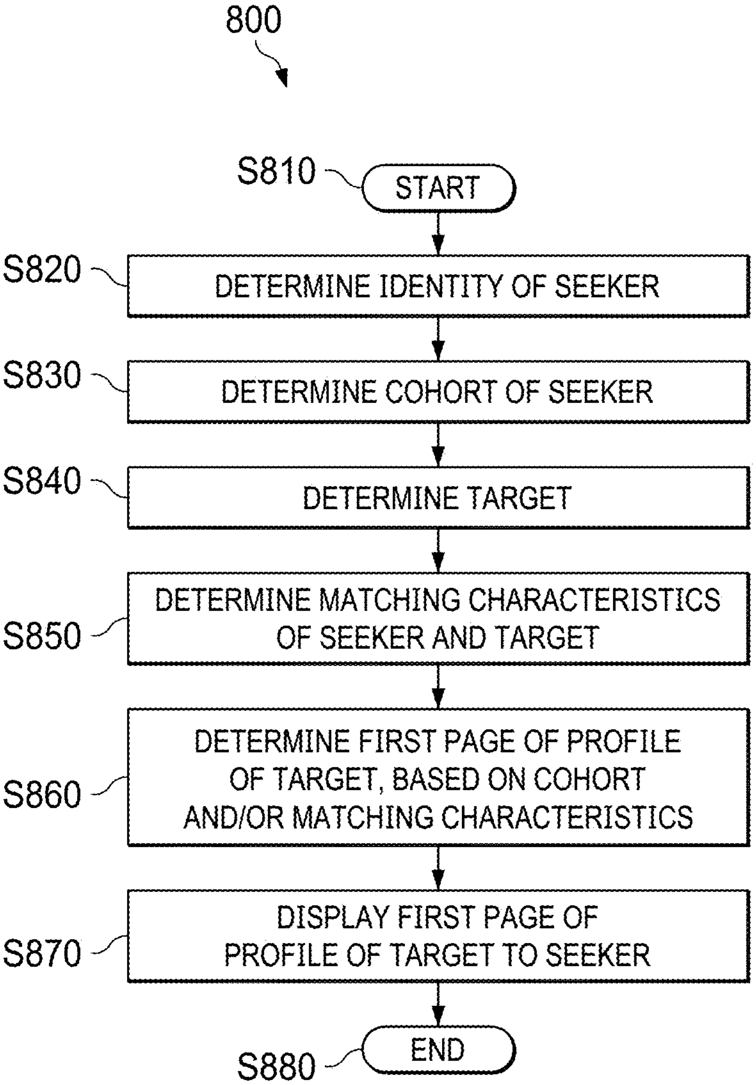
FIG. 8 illustrates an algorithm for dynamically ordering content, in accordance with an implementation of the present disclosure.

FIG. 8 illustrates an algorithm 800 for dynamically ordering content, in accordance with an implementation of the present disclosure. The algorithm 800 begins in S810 and advances to S820. In S820, the server determines an identity of the seeker. For example, when the seeker opens the on-line matching application program on his or her electronic device, the application program transmits an identifier of the identity of the seeker to the server. This identifier can be or include a user ID, a login, and/or biometric information (e.g., a photograph captured by the camera or a voice recording) of the seeker. In select implementations, this identifier can be provided by a third-party authentication (e.g., Google or Facebook). The server can receive this identifier via a network interface of the server. The algorithm 800 then advances to S830.

In S830, the server determines one or more cohorts of the seeker. The server can determine the cohort based on a relatively static identifier, such as a gender identity or sexual preference provided by the seeker at the time of registration. Because some cohorts are cultural, other examples of a relatively static identifier can be or include a nation in which the seeker is accessing the service or a nationality previously provided by the seeker. The server can determine the cohort based on other information provided by the seeker, such as an interest.

In addition, the server can determine the cohort, based on a dynamic identifier, such as an interest of the seeker. The sever can also determine the cohort, based on a meta identifier, such as an object recognized in a photograph uploaded by the seeker.

The algorithm 800 then advances to S840.

In S840, the server can determine a target to be displayed to the seeker. The server can determine the target in any manner. For example, the server can determine the target at least in part based on a boundary or preference of the seeker. The server can determine the target at least in part based on a boundary or preference of the target. The server can determine the target at least in part based on the target paying for greater visibility. The server can determine the target based on an age of the account of the seeker and/or an age of the account of the target (e.g., less than one week).

The server can determine the target at least in part based on an interest of the seeker and/or an interest of the target. Other implementations are possible.

The algorithm 800 then advances to optional S850.

In S850, the server optionally determines a matching characteristic of the seeker and the target. For example, the server can receive a preference from a seeker and from the target, such as a relationship goal. The server can determine whether the preference is the same (e.g., both of the preferences of the seeker and the target are "long-term") or overlaps (e.g., a preference of the seeker is "long term partner," and a preference of the target is "long-term, open to short"). In some implementations, the server determines the characteristic matches, if both preferences are the same. In other implementations, the server can determine the characteristic matches, if the preferences overlap.

The algorithm 800 then advances to S860.

In S860, the server determines an element of a first page of a profile of the target, at least in part based on the cohort of the seeker. For example, if the cohort of the seeker identifies as female, then the server can determine the element includes a biography of the seeker. If the cohort of the seeker identifies as male, then the server can determine the element includes a geographical distance of the seeker from the target.

In various implementations, the element can be or include a predetermined number of lines of a biography of the target. In at least one such implementation, the server can determine the predetermined number of lines, at least in part based on the cohort of the seeker. For example, if the cohort of the seeker identifies as female, then the predetermined number of lines can be greater than if the cohort of the seeker identifies as male.

In many implementations in which the server determines a matching characteristic in S850, the element of the first page of the profile of the target is determined at least in part based on the matching characteristic.

The algorithm 800 then advances to S870.

In S870, the server causes the electronic device of the seeker to display the first page of the profile of the target to the seeker.

The algorithm 800 then advances to S880 in which the algorithm 800 concludes.

The seeker can then interact with the profile of the target. For example, the seeker can move (e.g., scroll or flip) to additional pages of the target's profile. Thus, the seeker can see additional information of the target's profile. For example, in the case of Jane, a later page (e.g., the second page) of Bretman's profile can include Bretman's bio. Similarly, in the case of Liz, a later page (e.g., the second page) of Bretman's profile can include Bretman's relationship goals. Further, the seeker can "like" or "dislike" the profile of the target, thereby advancing to the next target.

Thus, some implementations of the present disclosure can allow seekers to more quickly make decisions regarding profiles of targets and like more profiles of targets. For example, users identifying as male favorably engage with profiles more often when they see the distance to the target initially. In addition, users identifying as female favorably engage with profiles more often when the biography of the target is show initially. Further, users identifying as female prefer seeing more lines of the biography of the target initially.

Thus, various implementations help members of the online community initially show more relevant content to the seeker. In addition, some implementations can resolve content collision, thereby avoiding overcrowding resulting from a failure to prioritize elements on the first page of the profile of the target.

Further, in select implementations of the algorithm 900, the server can determine an element of the first page of the profile of the target, at least in part based on a comparison of a value to a predetermined threshold.

For example, the server can determine a geographic distance of the location of the target from the location of the seeker. In doing so, the server can use any location for the locations of the target and/or the seeker. In some implementations, the locations are based on a GPS location received by the electronic devices of the target and/or the seeker. In other implementations, the locations are based on triangulated locations of the electronic devices. In select implementations, the locations are based on network locations, such as network registrations or known locations of nearby Wi-Fi routers. In particular implementations, the locations are based on self-reported locations of the target and/or seeker, such as a physical address. In some implementations, the locations are temporarily user-designated, such as by using Tinder Passport™.

The server can calculate the distance between the locations in any manner. For example, the server can calculate the distance using a straight-line distance. The server can calculate the distance based on a particular mode of transportation, such as roadways or railways.

The predetermined threshold can be a predetermined value (e.g., 15 miles), a value set by a seeker (e.g., as a preference), or dynamically calculated. The server can determine the predetermined threshold based on an average for a cohort (e.g., users who identify as male) or on a subcohort (e.g., users in a particular country or region who identify as male).

In some implementations, the server can calculate a travel time, based on the geographic distance and a mode of transportation. Thus, in selected implementations, the server can compare the travel time to a predetermined threshold. If the travel time is less than a predetermined duration (e.g., 20 minutes), the server can determine the element of the first page of the profile is or includes the travel distance and/or the travel time.

Various implementations of the present disclosure can minimize the burden on users when selecting high-quality profile photos that best represent themselves. As a result, these users have a greater chance of enjoyable experiences on dating platforms.

This feature can be employed for any service that facilitates social relationships. Profile photos can create an appealing first impression, not only for dating purposes, but also for any type of relationship. Ensuring users showcase their best images can significantly impact the experience on such platforms.

In a non-limiting use case, a user conveniently takes a photo of themselves using the front-facing camera of their smartphone (i.e., takes a "selfie"). The smartphone determines if the photo is suitable for identifying other photos of the user, previously stored on the smartphone. For example, the smartphone can determine whether there are multiple faces in the photo or if the edge of the photo cuts off the face of the user.

If the photo is suitable, the smartphone can conduct a convenient search of the other photos, looking for a face similar to that captured in the photo. The search can be focused on photos with only one face, where that face is not cut off by an edge of the photo. The search can focus on recent photos. Thus, the search can produce a photo suitable for use on an on-line dating service. Such a search can be completed in 20-30 seconds, for example; a timeout can be implemented to support this potential objective.

Once suitable photos are identified, the photos can be ranked so that the user can focus their attention on the photos that are more likely to be popular. To help this focus, some (or all) of the photos can be clustered, based on being taken in a burst mode, in a same location, or otherwise being very similar. Thus, a situation can be avoided in which the user spends time deciding among very similar pictures. Further, the diversity of photos can be increased, providing a greater richness of character in the context of an on-line dating service.

The ranked photos can then be presented to the user. The user can select at least one of these photos to be uploaded to the on-line dating service. The user can also select other photos to be uploaded.

Figure 10:
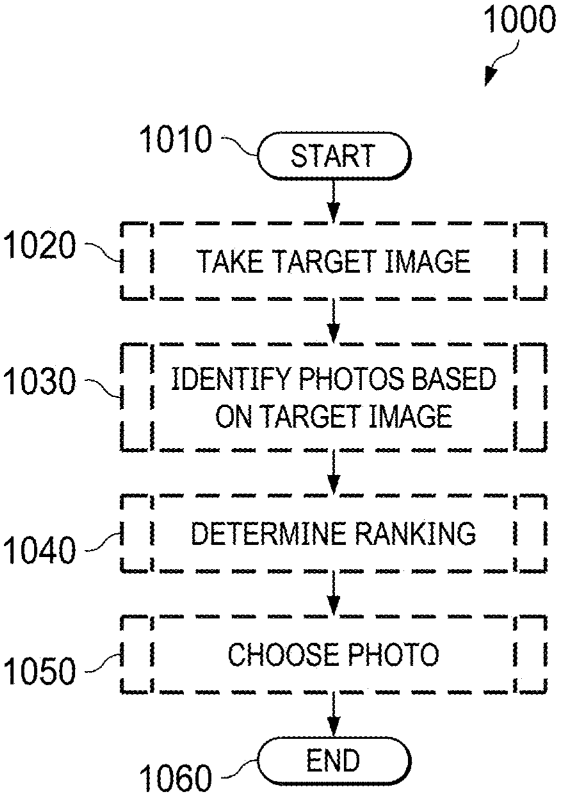
FIG. 10 illustrates an algorithm for photo selection, according to an implementation of the present disclosure.

FIG. 10 illustrates an algorithm 1000 for photo selection, according to an implementation of the present disclosure. The algorithm 1000 can be implemented with a computing device, such as a laptop computer, a smartphone, a tablet, a phablet, or other information processing device.

The algorithm 1000 includes four optional operations. Any particular implementation according to the present disclosure can practice as few as one operation of the algorithm 1000, as many as all four operations of the algorithm 1000, or two or three operations of the algorithm 1000.

The algorithm 1000 begins at 1010 and advances to optional 1020.

In 1020, the computing device can take a target image. The target image can be a photo of an individual, such photo potentially being a "selfie."

Many computing devices include a camera on a front face (e.g., that includes a display screen or a microphone) of the computing device. Similarly, many computing devices include a camera on a back face (e.g., that opposes the front face) of the computing device. These cameras sometimes vary in number (e.g., one front-facing on the front face, two or more rear-facing on the rear face). In addition, the hardware of these cameras can differ in terms of ability to zoom and to focus in view of the anticipated distances of the computing device from the subject of a picture.

For example, users of smartphones often take photos of themselves using a front-facing camera but often take photos of others using a rear-facing camera. However, this arrangement is merely one of convenience, and a photo can be taken of any particular individual with any particular camera. Accordingly, although it can be particularly advantageous if the photo taken in 1020 is a "selfie," the image taken in 120 can be by any camera of any individual. That is, the photo is in no way limited to being a "selfie."

Figure 11:
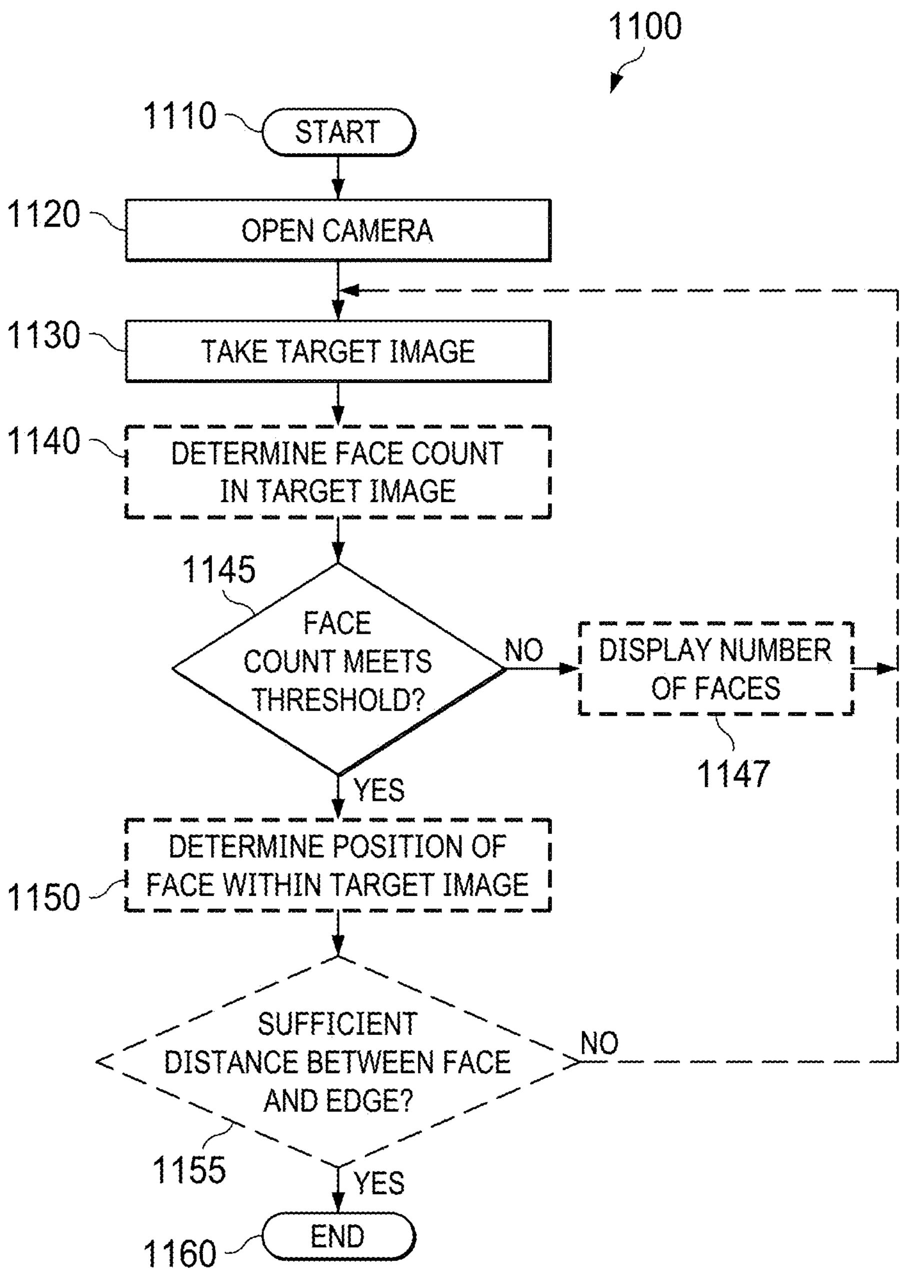
FIG. 11 illustrates an algorithm for creating a target image, according to an implementation of the present disclosure.

The operations of 1020 are discussed in more detail with regard to FIG. 11.

The algorithm 1000 then advances to optional 1030.

In 1030, the computing device can identify photos. In many implementations, these photos are stored in a memory included in the computing device. Photos can be stored in various physical memories or virtual memories. The computing device can access photos in different physical memories, such as a flash memory, a cache, or a Random Access Memory (RAM). These memories can be internal or connected externally. The computing device can additionally or alternatively include different virtual memories, such as in the form of partitions or folders. These virtual memories can include a most-recent photo, a photo album, and downloads, for example. In select implementations, these photos are stored remotely (e.g., in the "cloud") and are accessible by the computing device via a network, for example.

In various implementations, the computing device can identify the photos, based on the target image.

Figure 12:
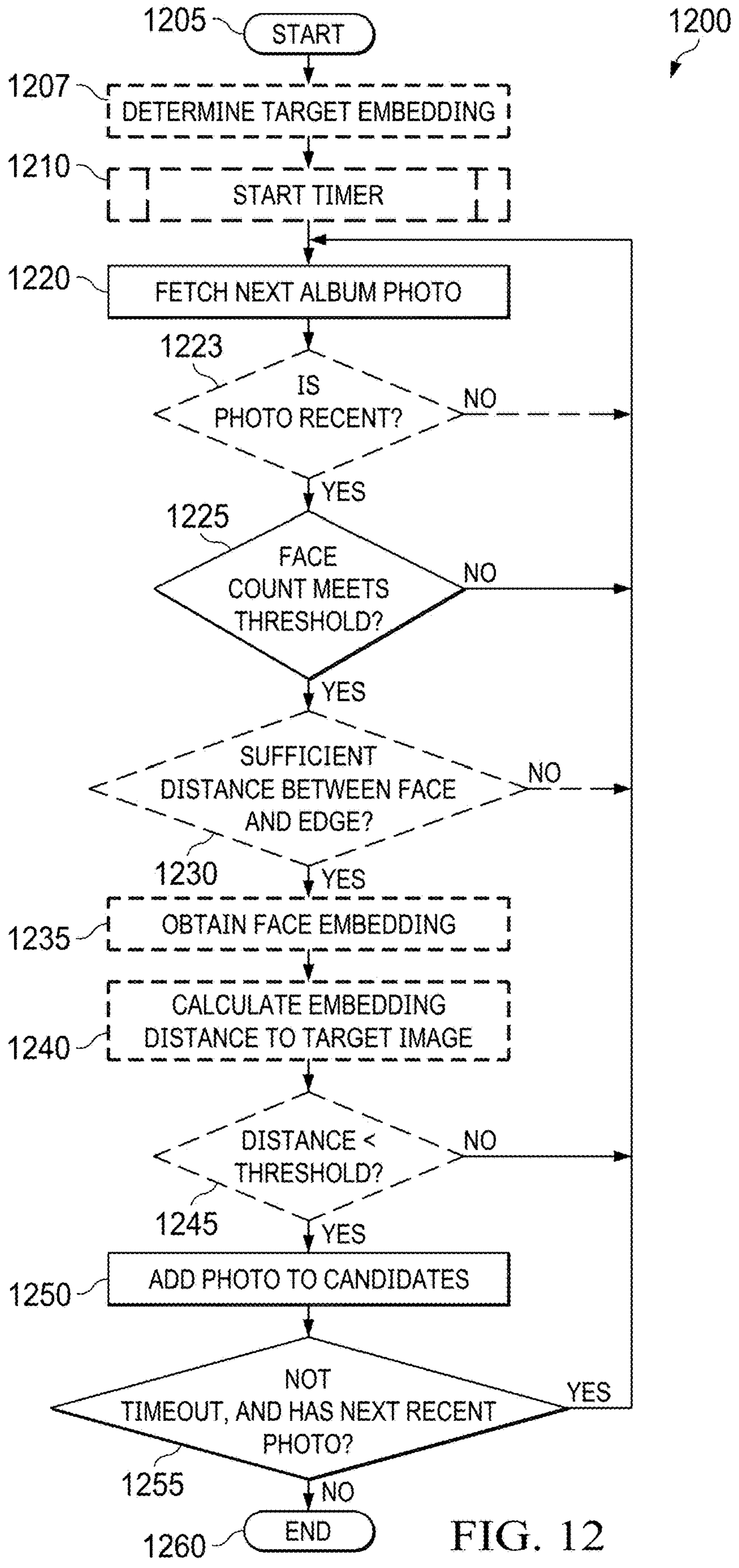
FIG. 12 illustrates an algorithm for identifying stored photos, according to an implementation of the present disclosure.

The operations of 1030 are discussed in more detail with regard to FIG. 12.

The algorithm 1000 then advances to optional 1040.

In 1040, the computing device can determine a ranking of the photos.

Figure 13:
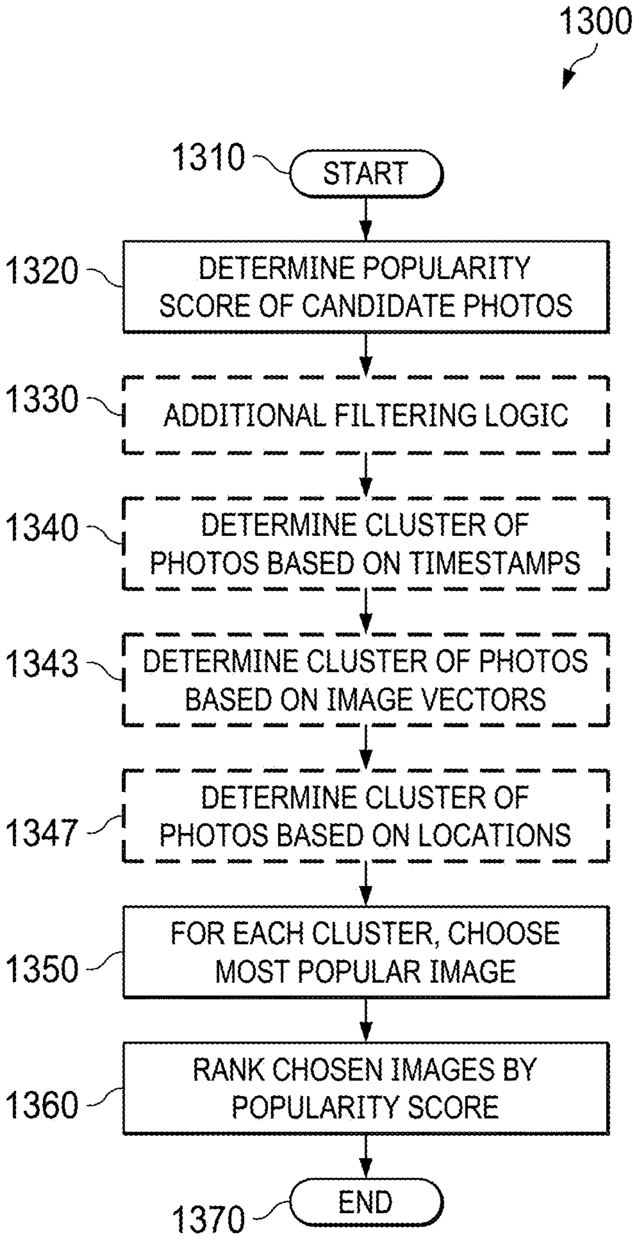
FIG. 13 illustrates an algorithm for determining a ranking of photos, according to an implementation of the present disclosure.

The operations of 1040 are discussed in more detail with regard to FIG. 13.

The algorithm 1000 then advances to optional 1050.

In 1050, the computing device can choose a photo. In many implementations, the photo is chosen for upload to a server associated with a service, such as an on-line dating service or influencer platform.

Figure 14:
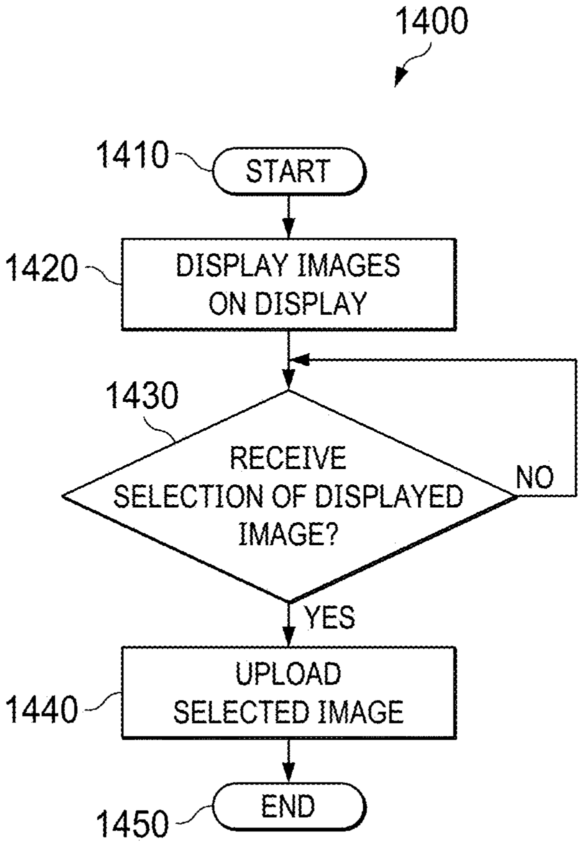
FIG. 14 illustrates an algorithm for choosing a photo, according to an implementation of the present disclosure.

The operations of 1050 are discussed in more detail with regard to FIG. 14.

'The algorithm 1000 then advances to 1060 and concludes.

FIG. 11 illustrates an algorithm 1100 for taking a target image, according to an implementation of the present disclosure.

The algorithm 1100 begins at 1110 and advances to 1120.

In 1120, the computing device can open a camera of the device. In some implementations, the camera is electromechanically opened by sending a signal to a lens cover. In various implementations, the camera is functionally opened by an application program (e.g., "app") that places one or more image sensors of the camera in a responsive state. The algorithm 1100 then advances to 1130.

In 1130, the camera can take a photo of a person with the camera to produce a target image. In several implementations, the photo can be a "selfie." The algorithm then advances to optional 1140.

In 1140, the computing device can determine a number of faces within the target image. This determination can be performed with image processing techniques that identify facial structures such as eyes, a nose, or a mouth, for example. In many implementations, these image processing techniques are implemented using machine learning, although conventional image processing techniques can also determine the number of faces within the target image.

The algorithm 1100 then advances to optional 1145.

In 1145, the computing device can determine whether the number of the faces in the target image meets a predetermined threshold. For example, the computing device can use a face detection model to determine the number of faces in a photo. If the predetermined threshold is 1, then the computing device can determine whether the image is a selfie, such that it is suitable for identifying similar photos to be uploaded to a profile of an on-line dating service for an individual user. In other implementations, the computing device can determine whether the image includes two faces, such that it is suitable for identifying similar photos to be uploaded to a profile of a couple. Thus, the term "meet" should be interpreted broadly, because various predetermined thresholds can be set, depending on the objective of a particular implementation. Further, various mathematical equalities and inequalities can be set to implement those thresholds. For example, whether the target image includes one face can equivalently be set forth as whether the number of faces in the target image is not greater than or equal to two faces.

If the computing device determines in 1145 that the number of the faces does not meet the predetermined threshold, then the algorithm 1100 advances to optional 1147. If the computing device determines in 1145 that the number of faces does meet the predetermined threshold, then the algorithm 1100 advances to optional 1150.

In 1147, the computing device can inform the user of the number of faces in the target image. For example, the computing device can display an error message indicating that the target image includes two faces. Of course, the computing device can additionally or alternatively output the error message audibly. Thus, the user can be informed of the reason why the target image is not suitable for the particular implementation. The algorithm 1100 then returns to 1130.

In 1150, the computing device can determine a position of a face within the target image. For example, the computing device can determine a position of a boundary of the face based on coordinates of the facial features within the target image. The boundary can be defined by a square, a rectangle, a circle, or any other shape or any combination of shapes.

The computing device can determine a relative size of the boundary of the face. For example, the computing device can determine whether the boundary of the face is large or small, relative to the size of the target image. For example, in some implementations, the boundary of the face might be defined too strictly, such that the face might take up more of the target image than determined by the boundary. In this situation, a relatively large face (e.g., 80% or more of the image size) is more likely to be cropped by an edge of the target image than a relatively small face (e.g., 10% or less of the image size). Thus, to avoid cropping a face, the computing device can determine a different degree of separation between a larger face and a nearest edge of the target image than between a smaller face and a nearest edge of the target image.

The algorithm 1100 then advances to optional 1155.

In 1155, the computing device can determine whether the position of boundary of the face in the target image is separated from an edge of the target image that is closest to the boundary of the face by at least a predetermined distance. The computing device can additionally or alternatively determine whether the position of the boundary of the face is separated by a predetermined distance from an edge of the target image that is second-closest to the boundary of the face. Of course, the computing device can additionally or alternatively determine the position of the boundary of the face relative to any of the edges or any combination of the edges of the target image.

To avoid cutting off the face, the predetermined distance can be one pixel in some implementations of the present disclosure. In many implementations, the predetermined distance can be greater than one pixel. Some such implementations can advantageously use this increased number of pixels when the face is relatively large.

If the computing device determines in 1155 that the position of the boundary of the face in the target image is sufficiently separated from the closest edge of the target image, the algorithm 1100 advances to 1160. If the computing device determines in 1155 that the position of the boundary of the face in the target image is not sufficiently separated from the closest edge of the target image, the algorithm 1100 returns to 1130.

In 1160, the algorithm 1100 concludes.

To perform group photo selection in 1145, implementations can receive a number of self-images or videos equal to or greater than a number of people indicated by an input received from a user (e.g., ≥1).

FIG. 12 illustrates an algorithm 1200 for identifying stored photos, according to an implementation of the present disclosure. The algorithm 1200 begins at 1205 and advances to optional 1207.

In 1207, the computing device can determine a target embedding (e.g., a face vector) of the target image. A "face vector" is a mathematical representation of a face extracted from an image. More specifically, the embedding can be in the form of 128, 256, or 512 vectors. Thus, a face vector can be considered a set of numerical values that capture features of a person's facial geometry. In many implementations, the embedding is determined only by the facial area of the photos. That is, the embedding is not limited to being performed on the entire target image.

The algorithm 1200 then advances to optional 1210.

In 1210, the computing device can start a timer. The "timer" should be interpreted broadly as measuring any time unit (e.g., clock cycles or seconds) and taking any form (e.g., stopwatch or alarm). The timer can be implemented in software, hardware, or firmware. The algorithm 1200 then advances to 1220.

In 1220, the computing device fetches a photo. The photo can be stored in any memory accessible to the computing device in various implementations. The photo can be selected based on any criteria, such as a timestamp of last-access, a filename, or a size, or based on a random selection. Likewise, the computing device can order the photos in increasing or decreasing order based on any criteria. In many implementations, the next photo is in a same virtual location (e.g., a camera roll, a picture album, a downloads folder) as a preceding photo. Thus, the computing device is not necessarily limited to being in the same virtual location as the preceding photo.

The algorithm 300 then advances to optional 1223.

In 1223, the computing device determines whether the photo is recent. This determination can be based on whether a timestamp (e.g., date created or date modified) of the photo is within a predetermined period of a current time. The predetermined period can be 18 months, for example. Other predetermined periods (e.g., 12 months or 24 months) are also possible, as is a user-defined period.

In other implementations, the computing device can order the images on the device by timestamp. Then, the computing device can determine a predetermined number (e.g., 30) or a predetermined percentage (e.g., 25%) of images on the device are sufficiently recent.

The algorithm 1200 then advances to 1225.

In 1225, the computing device determines whether the face count of the photo meets a predetermined threshold. This determination can be similar to the determination in 1145 and, in many implementations, the predetermined threshold in 1145 and the predetermined threshold in 1225 are the same. For group photo selection, the computing device obtain group photos that contain a number of faces equal to the number of people indicated by an input received from a user.

If the computing device determines in 1225 that the face count does not meet the predetermined threshold, the algorithm 1200 returns to 1220 to select a next photo. If the computing device determines in 1225 that the face count does meet the predetermined threshold, the algorithm 1200 advances to optional 1230.

In 1230, the computing device determines whether the position of the boundary of the face in the photo is separated from an edge of the photo that is closest to the boundary of the face by at least a predetermined distance. The determination in 1230 can be similar to the determination in 1155 and, in many implementations, the predetermined distance in 1155 and the predetermined distance in 1230 are the same.

If the computing device determines in 1230 that there is not a sufficient distance between the face and an edge of the photo, the algorithm 1200 returns to 1220. If the computing device determines in 1230 that there is a sufficient distance between the face and an edge of the photo, the algorithm 1200 advances to optional 1235.

In 1235, the computing device can determine an embedding (e.g., a face vector) of a face in the photo. This operation is similar to the embedding determined in 1207.

The algorithm 1200 then advances to optional 1240.

In 1240, the computing device can calculate a distance between the embedding of the face of the photo and the embedding of the face of the target image. The algorithm 1200 then advances to optional 1245.

In 1245, the computing device can determine whether the distance calculated in 1240 meets a predetermined threshold. For example, the computing device can determine the predetermined threshold is met if the distance is less than the predetermined threshold. As discussed above, one of ordinary skill in the art would understand that whether the predetermined threshold is met can be expressed through various equalities or inequalities, such as "less than or equal to." Further, the predetermined threshold can be adjusted, based on the number of images in the album stored on the computing device, for example.

If the computing device determines in 1245 that the distance does not meet the predetermined threshold, the algorithm 1200 returns to 1220. If the computing device determines in 1245 that the distance meets the predetermined threshold, the algorithm 1200 advances to 1250.

In 1250, the computing device adds the photo to the candidate photos. These candidate photos can be identified by the computing device for use in connection with FIG. 13 regarding potential upload to an on-line dating service, for example.

The algorithm 1200 then advances to 1255.

In 1255, the computing device can determine whether the timer started in 1210 has timed out. As before, this determination can be expressed through various equalities or inequalities, such as whether a value of the timer is less than a predetermined duration.

The computing device can additionally or alternatively determine whether a next recent photo is available, such as within a same album, other portion of memory, or remotely.

If the computing device determines in 1255 that the timer has not timed out and that a next recent photo is available, then the algorithm 1200 returns to 1220. On the other hand, if the computing device determines in 1255 that the timer has timed out or that a next photo is not available, the algorithm advances to 1260.

In 1260, the algorithm 1200 concludes.

In some implementations, the computing device can eliminate photos with very small faces.

For group photo selection, the algorithm 1200 can be repeated for the number of people indicated by an input received from the user.

FIG. 13 illustrates an algorithm 1300 for determining a ranking of photos, according to an implementation of the present disclosure. The algorithm 1300 begins at 1310 and advances to 1320.

In 1320, the computing device determines a popularity score of a plurality of photos. In many implementations, the plurality of photos is or includes the candidate photos to which photos were added in 1250 of FIG. 12.

For example, the computing device can apply a machine-learning/artificial intelligence (AI) model that provides the popularity score, which that indicates the popularity of a respective photo.

In a common implementation, the computing device executes an app distributed on behalf of a service provider. The service provider can provide an on-line dating service, for example. The service provider can accumulate data regarding different outcomes (e.g., a "like") or non-outcomes (e.g., failure to "like") of displaying images. For example, the service provider can display a photo in a profile of a first user to a second user and record whether the second user "liked" the photo or the profile of the first user.

The accumulated data is not limited to the content of the image itself. Indeed, to respect privacy, the service provider can maintain an embedding of the image, rather than the image. Thus, the service provider can use the popularity of a first image to predict the popularity of a similar, second image, without using the content of the first image or any identifying information from the first image. Further, the accumulated data can additionally or alternatively concern metadata about the image, such as the lighting in the image, the quality of the image, the size of the image, or the aspect ratio of the image, particularly regarding a face.

The operation recorded in the accumulated data is not limited to "liking" and can include communicating with the first user, recommending or sharing the profile of the first user, etc.

Thus, the AI model can be trained based on accumulated data that imply the popularity of each photo. The accumulated data can be obtained as the service is operated such as matching history data regarding which photos are popular as profile photos.

In determining the popularity score of the respective image, the model can first extract one or more vectors from the respective image.

In various implementations, the popularity score can be determined with conventional (e.g., non-AI) algorithms.

The algorithm 1300 then advances to optional 1330.

In 1330, the computing device applies additional filtering logic. For example, the computing device can determine whether a respective image is in a standard format (e.g., image size or number of pixels) for profile photos on an on-line dating service.

In some implementations, the computing device can convert the respective image into the standard format. For example, the computing device can increase or decrease the size of the image, interpolate pixels from the original image, crop or extend the image, or change a format (e.g., bitmap [BMP], portable network graphic [PNG], WebP) of the image.

In some implementations, the computing device can enhance the popularity score based on whether a respective image is in the standard format. Thus, photos that meet the profile standard format can be prioritized for selection.

In some implementations, the filtering logic can perform moderation. For example, the filtering logic can filter out violent, pornographic, advertising, and other undesired images. Alternatively, the filtering logic can flag an image for review. Thus, by adding moderation, the possibility of abuse in the selected photos can be reviewed.

The computing device can implement the filtering logic using AI or conventional programming techniques.

The algorithm 1300 then advances to optional 1340.

Many cameras now include a feature like burst mode (sometimes called continuous mode) in which several photos are taken within a short period of time. In some implementations, several photos can be taken within one second. Because there is not much time for action to occur between photos, the photos can seem almost identical. In addition, use of the burst mode can create a large number of photos in a camera roll. Accordingly, it can be burdensome for a user to determine which of these numerous, similar photos might be most suitable for a service, such as an on-line dating service. Thus, to alleviate the burden of selecting just one image from many, similar images, various implementations can cluster continuous shots and select only the one with the highest popularity score from each cluster.

Accordingly, in 1340, the computing device determines whether a photo belongs to a cluster of photos, based on respective timestamps of those photos. In particular, the computing device can determine whether a photo is taken within a predetermined duration (e.g., within one second or one minute) of another photo. The predetermined duration can be adjusted based on a user input, for example.

For example, the computing device can determine whether a timestamp of the photo is within the predetermined duration of a timestamp of the same type of the other photo. Such types of timestamp can be or include "time created" or "last modified."

If the computing device determines that the photo is taken within the predetermined period of time of the other photo, then the computing device can determine the photo and the other photo are part of the same cluster. If the computing device determines that the photo is not taken within the predetermined time of the other photo, then the computing device can determine that the photo and the other photo are not necessarily part of the same cluster.

The algorithm 1300 then advances to optional 1343.

In 1343, the computing device can determine whether a photo belongs to a cluster of photos, based on respective image vectors. Thus, this determination can provide a different basis for analyzing the images by considering the content of the images, as represented by image vectors, rather than merely the timestamps of the images. Thus, this determination can better handle a situation in which similar photos are taken at times separated by more than the predetermined duration. Likewise, this determination can avoid a situation in which vastly different photos are taken within the predetermined duration.

In particular, the computing device can determine whether an image vector of the photo is within a predetermined distance of an image vector of another photo. If the computing device determines the image vector of the photo is within the predetermined distance of the image vector of the other photo, then the photo and the other photo are part of the same cluster. If the computing device determines the image vector of the photo is not within the predetermined distance of the image vector of the other photo, then the photo and the other photo are not necessarily part of the same cluster.

The algorithm 1300 then advances to optional 1347.

In 1347, the computing device can determine whether an image belongs to a cluster of images, based on respective locations. For example, if two photos are taken in an almost identical geographical position, the photos might be very similar. Accordingly, the computing device can determine a geographical position from metadata associated with a respective image. For example, the metadata might be or include coordinates according to a global navigation satellite system, such as the Global Positioning System (GPS), Global Navigation Satellite System (GLONASS), BeiDou Navigation Satellite System (BDS), or Galileo. Alternatively or additionally, various implementations can use what3Words® or Google Plus Codes instead of coordinates. The computing device might determine the location of the photos based on the scenery or background of the photos.

If the computing device determines that the geographical position of a photo is within a predetermined distance of the geographical position of another photo, then the computing device can determine that the photo and the other photo are part of the same cluster. If the computing device determines that the geographical position of a photo is not within the predetermined distance of the geographical position of another photo, then the computing device can determine that the photo and the other photo are not necessarily part of the same cluster.

Substantially different photos can be taken even from a same geographical position. Therefore, many implementations set the predetermined distance at a very low value, such as 0. Further, although determining relative geographical positions might be computationally efficient (particularly if the predetermined distance is 0), clustering based on geographical position can be fairly noisy. Accordingly, many implementations use geographical position to supplement the clustering based on timestamps or image vectors. For example, photos taken one minute apart might not be part of the same cluster, if the geographical positions of the photos are rather distant (e.g., 1 kilometer). Alternatively or additionally, because it might be computationally inefficient to compute image vectors between many images, some implementations can perform 1347 before 1343 to limit the number of images between which the distances of image vectors are computed to those in the same or similar geographic positions.

The algorithm 1300 then advances to 1350.

In 1350, the computing device can choose the most popular image among images in each cluster. This choice can be at least in part based on the popularity score of each image in the cluster. Specifically, the computing device can choose the image in the cluster with the highest popularity score, for example.

The algorithm 1300 then advances to 1360.

In 1360, the computing device can rank the chosen photos. The ranking can be based on the respective popularity score of each of the chosen photos, for example. Therefore, the computing device can easily display or upload one or more photos that might be the most popular.

The algorithm 1300 then advances to 1370 and concludes.

Clustering can also be done using DBScan clustering for a concatenation of image vectors and timestamps, for example.

In some implementations, 1330 can be performed before 1320 to avoid determining popularity scores for photos that are filtered out.

FIG. 14 illustrates an algorithm 1400 for choosing a photo, according to an implementation of the present disclosure.

The algorithm 1400 begins at 1410 and advances to 1420.

In 1420, the computing device displays a plurality of images on a display of the device. The plurality of images can include the photos in the camera roll of the computing device, for example. The plurality of images can be displayed as discussed later in connection with FIGS. 15A-15C.

The algorithm 1400 then advances to 1430.

In 1430, the computing device determines whether a selection of a displayed image was received. If the computing device determines in 1430 that a selection of a displayed image was not received, then the algorithm 1400 returns to 1430. If the computing device determines in 1430 that a selection of a displayed image was received, the algorithm 1400 advances to 1440.

In 1440, the computing device uploads the selected image to a service, such as an on-line dating service, for example. The upload can include an indication that the selected image is for use as a profile picture of the user of the computing device.

In many implementations, for privacy reasons, only the photos chosen by the user in 1430 are uploaded or sent to the backend servers. Further, in various implementations, the computing device can process the selected photos into a suitable format and size before uploading them. The format and size can be determined by the on-line dating service as suitable for profile pictures, for example.

Figure 15A:
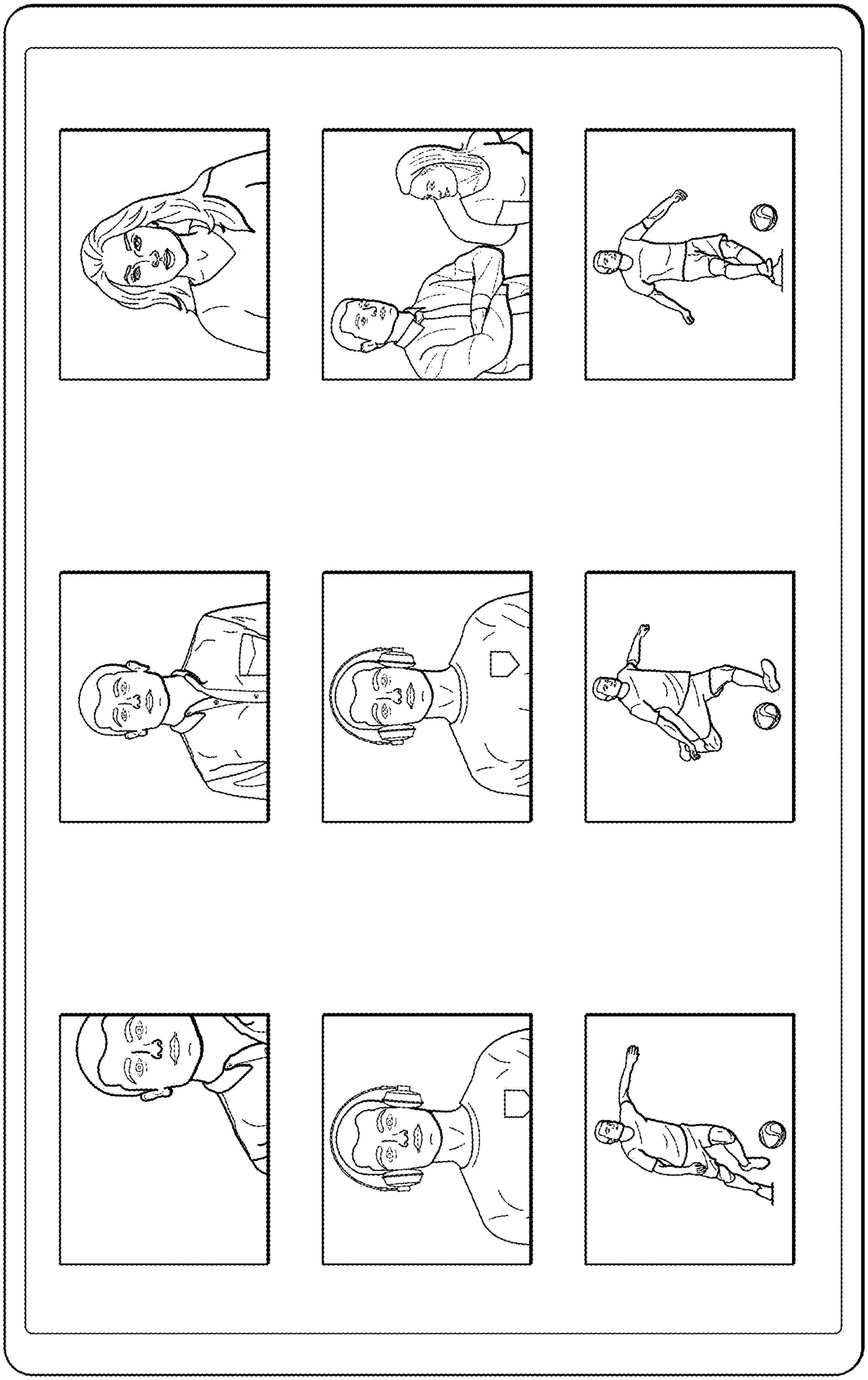
FIGS. 15A, 15B, and 15C illustrate screenshots in a photo selection, according to an implementation of the present disclosure.
Figure 15B:
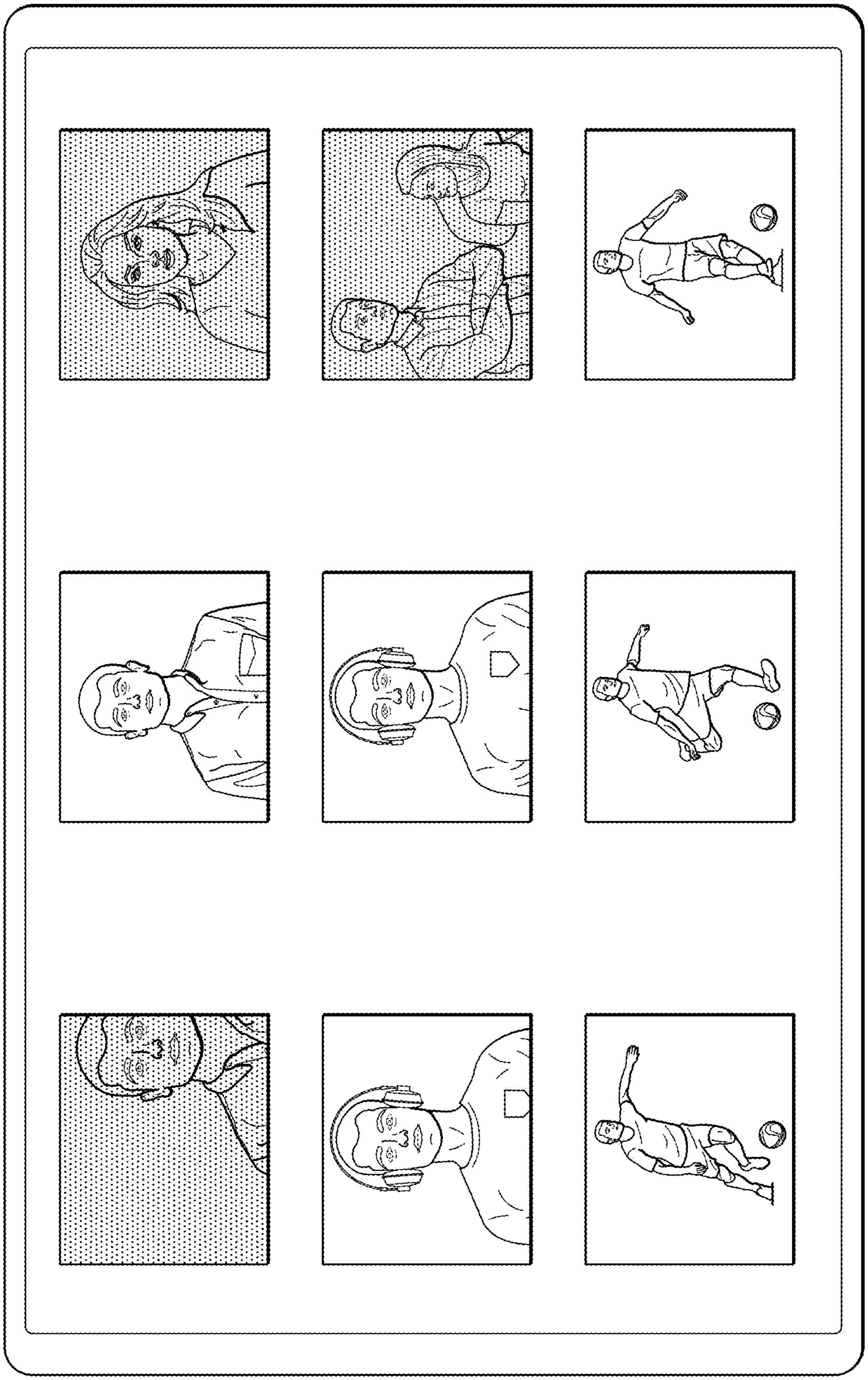
Figure 15C:
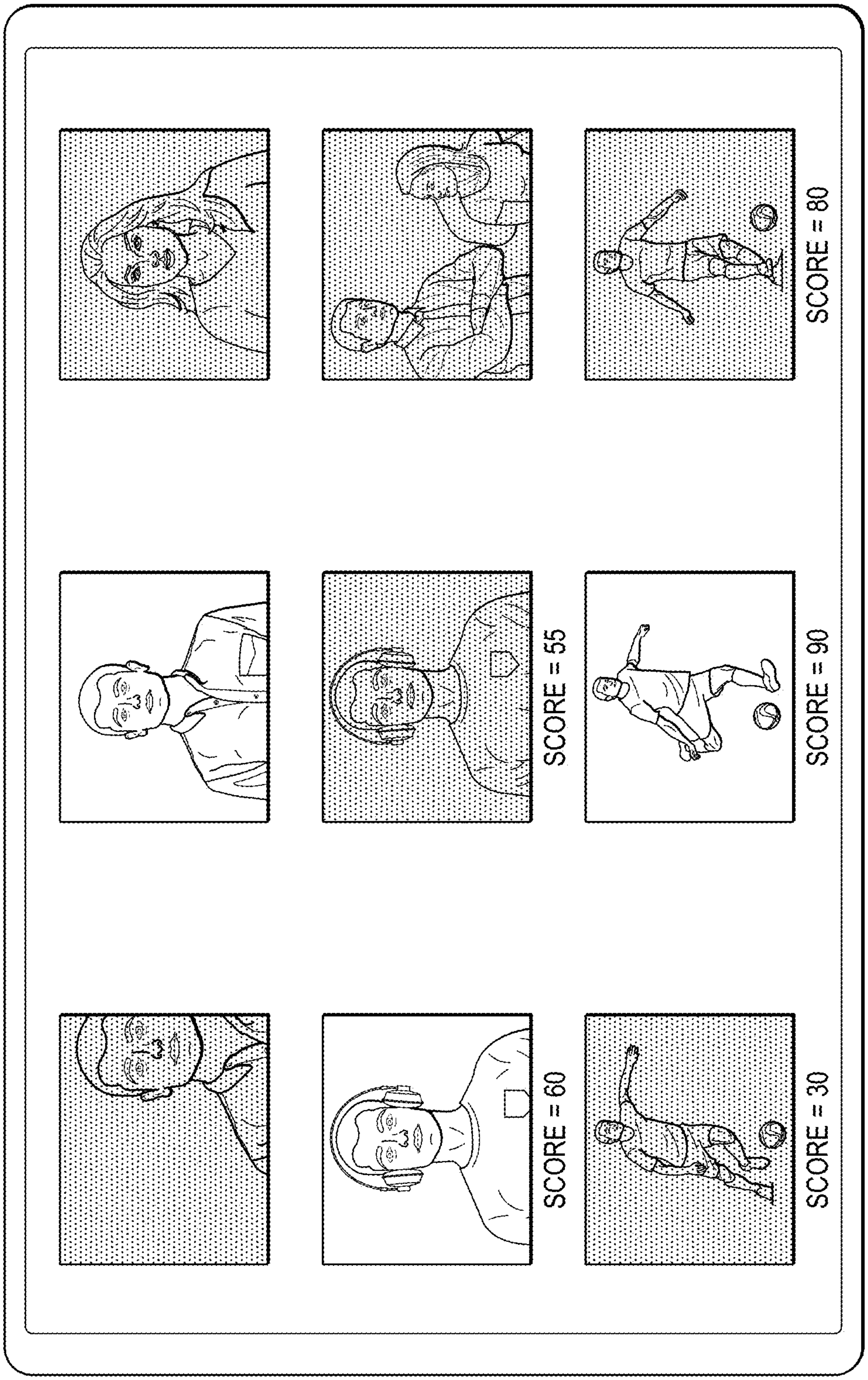

FIGS. 15A, 15B, and 15C illustrate screenshots as displayed on a computing device, according to an implementation of the present disclosure. In FIGS. 15A, 15B, and 15C, the photos are shown on a static, single page. However, the photos can be displayed in a scrollable single page or across multiple pages.

FIG. 15A illustrates nine photos from the camera roll of the computing device. Generally, these photos show the same individual. However, one photo shows the same individual with a different person (middle right), and one photo shows only a different person (top right). Two photos in the middle row (left and center) are similar, and the three photos on the bottom row are also similar.

FIG. 15B illustrates the photos according to an implementation of some of the operations of FIGS. 11-13. As discussed in connection with 1130, a first target image, such as shown in the upper left, can be taken by a computing device. This image does not have a sufficient distance between the face and an edge of the photo, as discussed in connection with 1155. The first target image can be deselected. Therefore, the computing device takes a second target image, such as shown in the middle of the upper row.

The computing device can process the remaining photos in the camera roll. For example, if the face count does not meet the threshold in 1225, the image can be deselected, such as shown in the right photo of the middle row.

Further, the embedding distance between the second target image (center of upper row) and the other person (right of upper row) is relatively large, because the photos are of different people. Thus, the photo of the other person can be deselected, as discussed in connection with 1245. Advantageously, this deselection can protect the privacy of the other person.

FIG. 15C illustrates an example of the score determination of 1320, the clustering of 1340, and the choice of 1350. Here, the computing device scores each photo of the cluster of the middle row and the cluster of the lower row. The computing device determines that the left and center photos of the middle row form a first cluster, e.g., based on timestamps or image similarities. The computing device determines that the photos of the bottom row form a second cluster, e.g., based on timestamps or image similarities. The computing device can then select the photo with the highest score in each cluster or deselect the photos in the cluster that do not have the highest score.

Figure 16:
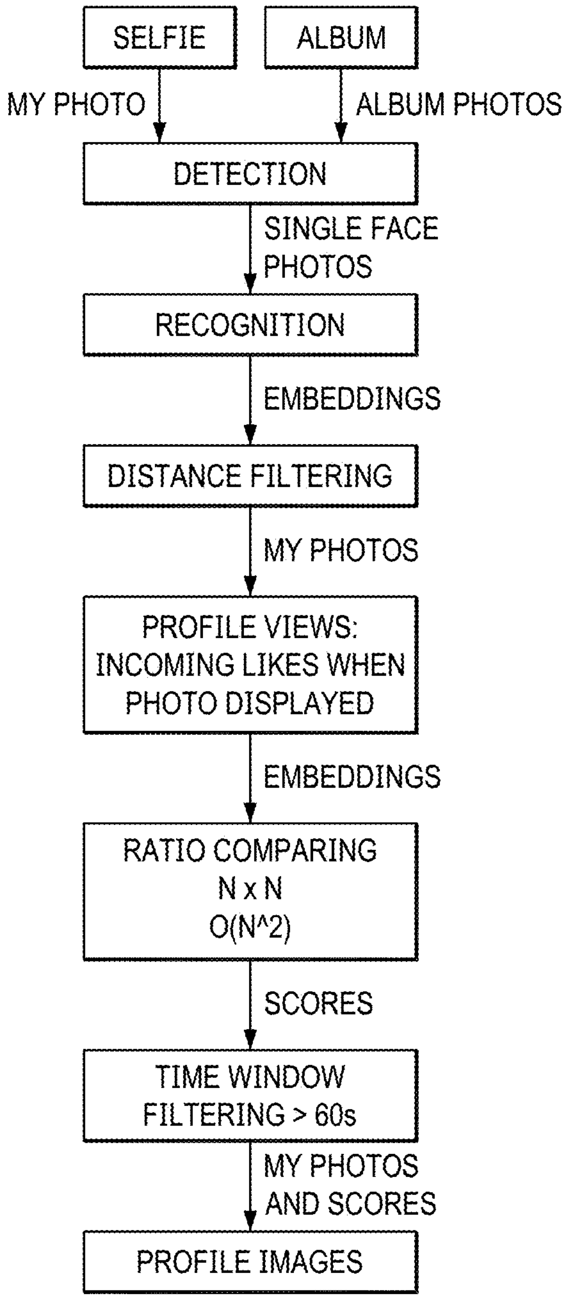
FIG. 16 illustrates an overall algorithm, according to an implementation of the present disclosure.

FIG. 16 illustrates an overall algorithm for photo selection, according to an implementation of the present disclosure. As shown in FIG. 16, the computing device can begin with a selfie as a target image (e.g., "my photo") and an existing album (e.g., "album photos"). The computing device can perform detection to identify single face photos and perform recognition to determine embeddings of the selfie and the photos in the existing album. The computing device can perform distance filtering, at least in part based on a distance between the embeddings of the selfie and the other photos, to determine photos (e.g., "my photos") of a user in the album.

The computing device can then take the ratio of profile views to incoming likes when each photo is displayed to determine additional embeddings and perform a comparison of N×N to determine scores of the photos. The computing device can filter photos into clusters based on filtering out photos that are separated by more than 60 seconds (e.g., so that the clusters contain photos separated by less than or equal to 60 seconds). Thereby, the computing device can produce photos and scores, as shown in connection with FIG. 15C, which can be uploaded to a server as profile images.

Various modifications are within the scope of the present disclosure. For example, the order of operations 1030 and 1040 can be changed.

Some implementations of the present disclosure can request access to the user's camera roll and can request users to take a selfie or a video of the user, such as in 1130. The selfies or videos of the user can be used for identification or verification of the user. In various implementations, the computing device can access the user's picture album or the user's profile account on a service, such as on-line dating service.

Some social services already mandate that users take a selfie for verification purposes. Thus, integrating implementations of this disclosure with an existing selfie verification process can yield additional benefits and enhance overall synergy. For example, the selfies taken for photo selection can also be used for selfie verification.

A photo selection in accordance with the present disclosure can be executed in computer software such as mobile applications or in web services.

Figure 9:
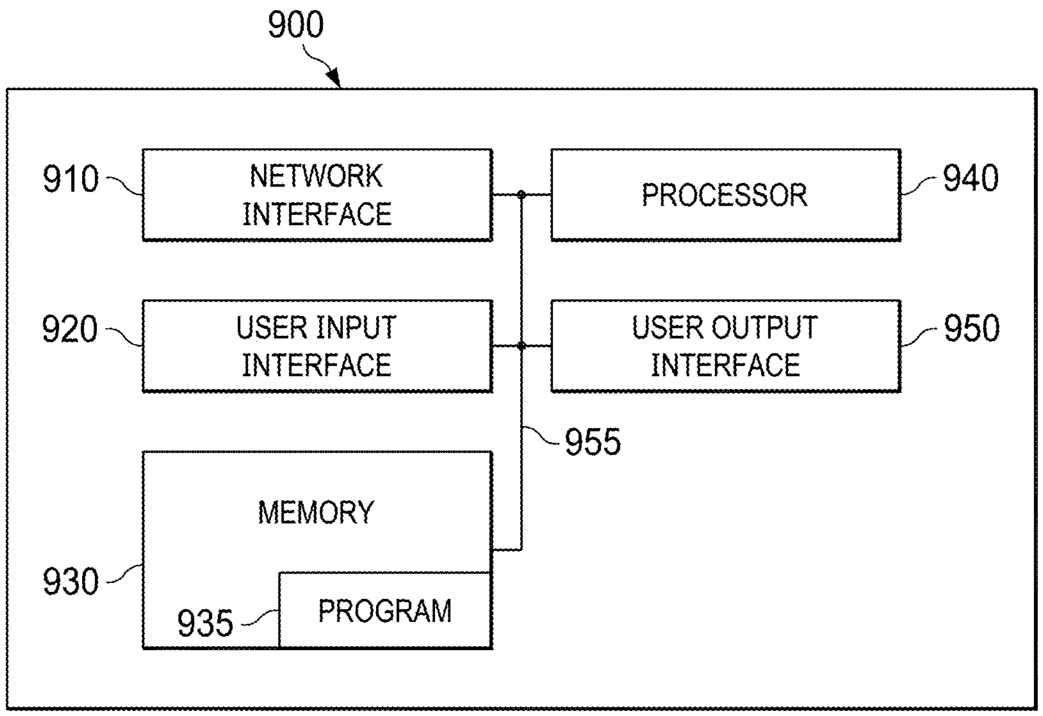
FIG. 9 illustrates a computing device in accordance with an implementation of the present disclosure.

In another implementation of the present disclosure, FIG. 9 illustrates a computing device 900. The computing device 900 can implement the user device or the server of the present disclosure.

The computing device 900 includes a network interface 910, a user input interface 920, a memory 930, a program 935, a processor 940, a user output interface 950, and a bus 955.

The network interface 910 performs communications between the computing device 900 and another device over a network.

The user input interface 920 receives one or more inputs from a human user.

The user output interface 950 outputs one or more outputs to a human user. In many implementations, the user input interface 920 and the user output interface 950 can be included in a same structure, such as a touchscreen.

The bus 955 performs communications between the elements of the computing device 900.

In certain example implementations, the matching operations outlined herein, such as those carried out by server and/or provided as an application program for an endpoint being operated by an end user (e.g., a mobile application program for an iPhone or Android device), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory 930 can store data used for the operations described herein. This includes the memory 930 being able to store software, logic, code, or processor instructions (e.g., program 935) that are executed to carry out the activities described in this Specification.

The processor 940 can execute any type of instructions associated with the data to achieve the operations detailed herein in this Specification. The activities outlined herein can be implemented with fixed logic or programmable logic (e.g., software/computer instructions executed by a processor) and the elements identified herein can be a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein can maintain information in any suitable memory (random access memory ("RAM"), ROM, EPROM, EEPROM, ASIC), software, hardware, or in any other suitable component, device, element, or object where appropriate. Any of the memory items discussed herein should be construed as encompassed within the broad term "memory." Similarly, any of the potential processing elements, modules, and machines described in this Specification should be construed as encompassed within the broad term "processor." Each of the network elements can also include suitable interfaces for receiving, transmitting, and/or otherwise communicating data or information in a network environment.

With the examples provided, interaction may have been described in terms of more than one network element. However, this has been done for purposes of clarity and example only. In certain cases, it might be easier to describe one or more of the functionalities of a given set of flows by only referencing a limited number of network elements. The server and electronic device are readily scalable and can accommodate a large number of components, as well as more complicated/sophisticated arrangements and configurations. Accordingly, the examples provided should not limit the scope or inhibit the broad teachings of the server and electronic device as potentially applied to a myriad of other architectures.

The operations in the preceding flow diagrams illustrate only some of the possible scenarios and patterns that may be executed by, or within, the system. Some of these operations can be deleted or removed where appropriate, or these operations can be modified or changed considerably without departing from the scope of the present disclosure. The timing of these operations may be altered considerably. The preceding operational flows have been offered for purposes of example and discussion. Substantial flexibility is provided by the systems in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art, and it is intended that the present disclosure encompass all such changes, substitutions, variations, alterations, and modifications as falling within the scope of the disclosure.

EXAMPLES

In Example AM1, a method includes receiving a registration request from a first user, the registration request including a boundary of the first user; receiving an action from the first user on a profile of a second user; determining attributes of performance images, at least in part based on a population of users; transmitting photo identification information to the first user, the photo identification information including the attributes of the performance images; receiving a plurality of images from the first user; and adding the plurality of images to a profile of the first user.

Example AM2 is the method of Example AM1, further comprising: refining the population of users, wherein the attributes of the performance images at least in part are based on the population.

Example AM3 is the method of Example AM2, wherein the refining the population includes determining potential crushes of the first user, at least in part based on the second user and the boundary of the first user.

Example AM4 is the method of Example AM3, wherein the refining the population includes refining the potential crushes of the first user, at least in part based on the first user's preferences.

Example AM5 is the method of any of Examples AM2-AM4, further comprising: receiving an action from a third user on the profile of the first user, wherein the profile of the first user includes an image, and the performance images include the image.

Example AM6 is the method of Example AM5, wherein the refining the population includes determining potential admirers of the first user, at least in part based on the third user and boundaries of the potential admirers.

Example AM7 is the method of Example AM6, wherein the refining the population includes refining the potential admirers, based on preferences of the potential admirers.

Example AM8 is the method of any of Examples AM1-AM7, wherein the photo identification information includes a biometric fingerprint of the first user.

Example AM9 is the method of Example AM8, further comprising: generating the biometric fingerprint of the first user, at least in part based on a verification video of the first user, wherein the registration from the first user includes the verification video.

In Example AA1, an apparatus includes a network interface that receives a registration request from a first user, transmits a profile of a second user to the first user, and receives an action from the first user on the profile of a second user; and a processor configured to determine attributes of performance images, at least in part based on a population of users, wherein the network interface transmits photo identification information to the first user and receives a plurality of images from the first user, the photo identification information including the attributes of the performance images, and the processor is further configured to add the plurality of images to a profile of the first user.

Example AA2 is the apparatus of Example AA1, wherein the processor is further configured to perform a refinement of the population of users, and the attributes of the performance images at least in part are based on the population.

Example AA3 is the apparatus of Example AA2, wherein the refinement includes determining potential crushes of the first user, at least in part based on the second user and the boundary of the first user, the registration request including a boundary of the first user.

Example AA4 is the apparatus of Example AA3, wherein the refinement includes refining the potential crushes of the first user, at least in part based on the first user's preferences.

Example AA5 is the apparatus of Example AA2, wherein the network interface receives boundaries in registrations of potential admirers of the first user and receives an action from a third user on the profile of the first user, the profile of the first user includes an image, the refinement includes determining the potential admirers of the first user, at least in part based on the third user and the boundaries of the potential admirers, and the performance images include the image.

Example AA6 is the apparatus of Example AA5, wherein the refinement includes refining the potential admirers, based on preferences of the potential admirers, and the registrations of the potential admirers include the preferences.

Example AA7 is the apparatus of any of Examples AA1-AA6, wherein the processor is further configured to generate a biometric fingerprint of the first user, at least in part based on a verification video of the first user, the registration request from the first user includes the verification video, and the photo identification information includes the biometric fingerprint of the first user.

In Example AC1, a computer-readable medium is encoded with executable instructions that, when executed by a processing unit, perform operations including receiving a registration request from a first user; transmitting a profile of a second user to the first user; receiving an action from the first user on the profile of a second user; determining attributes of performance images, at least in part based on a population of users; transmitting photo identification information to the first user, the photo identification information including the attributes of the performance images; receiving a plurality of images from the first user; and adding the plurality of images to a profile of the first user.

Example AC2 is the medium of Example AC1, the operations further comprising: refining the population of users, wherein the attributes of the performance images at least in part are based on the population.

Example AC3 is the medium of Example AC2, wherein the refining the population includes determining potential crushes of the first user, at least in part based on the second user and the boundary of the first user, the registration request including a boundary of the first user.

Example AC4 is the medium of Example AC3, wherein the refining the population includes refining the potential crushes of the first user, at least in part based on the first user's preferences.

Example AC5 is the medium of Example AC2, the operations further comprising: receiving an action from a third user on the profile of the first user, wherein the profile of the first user includes an image, and the performance images include the image; and receiving boundaries in registrations of potential admirers of the first user, wherein the refining the population includes determining the potential admirers of the first user, at least in part based on the third user and the boundaries of the potential admirers.

Example AC6 is the medium of Example AC5, wherein the refining the population includes refining the potential admirers, based on preferences of the potential admirers, and the registrations of the potential admirers include the preferences.

Example AC7 is the medium of any of Examples AC1-AC6, the operations further comprising: generating a biometric fingerprint of the first user, at least in part based on a verification video of the first user, wherein the registration request from the first user includes the verification video, and the photo identification information includes the biometric fingerprint of the first user.

In Example BM1, a method is implemented by an electronic device. The method includes transmitting a registration request of a first user; receiving photo identification information including performance image information; identifying a preliminary group of images stored on the electronic device, at least in part based on the performance image information; and displaying the preliminary group of images.

Example BM2 is the method of Example BM1, wherein the photo identification information includes biometric fingerprint information, and the preliminary group of images is identified at least in part based on the biometric fingerprint information.

Example BM3 is the method of any of Examples BM1-BM2, wherein the registration request includes a verification video including a face of the first user, and the biometric fingerprint information at least in part is based on the face of the first user.

Example BM4 is the method of any of Examples BM1-BM3, further comprising: displaying a profile of a second user; receiving an input indicating a preference for the profile of the second user; and transmitting an indication of the input, wherein the photo identification information is at least in part based on the preference.

Example BM5 is the method of any of Examples BM1-BM4, wherein the group of images is identified at least in part based on including a human face.

Example BM6 is the method of any of Examples BM1-BM5, further comprising: receiving an input to approve a subset of the preliminary group of images.

Example BM7 is the method of Example BM6, further comprising: transmitting the subset of the preliminary group of images.

In Example BC1, a computer-readable medium is encoded with executable instructions that, when executed by a processing unit, perform operations including transmitting, via a network interface, a registration request of a first user; receiving, via the network interface, photo identification information including performance image information; identifying a preliminary group of images stored on the electronic device, at least in part based on the performance image information; and displaying, via a display, the preliminary group of images.

Example BC2 is the medium of Example BC1, wherein the photo identification information includes biometric fingerprint information, and the preliminary group of images is identified at least in part based on the biometric fingerprint information.

Example BC3 is the medium of any of Examples BC1-BC2, wherein the registration request includes a verification video including a face of the first user, and the biometric fingerprint information at least in part is based on the face of the first user.

Example BC4 is the medium of any of Examples BC1-BC3, the operations further comprising: displaying, via the display, a profile of a second user; receiving an input indicating a preference for the profile of the second user; and transmitting, via the network interface, an indication of the input, wherein the photo identification information is at least in part based on the preference.

Example BC5 is the medium of any of Examples BC1-BC4, wherein the group of images is identified at least in part based on including a human face.

Example BC6 is the medium of any of Examples BC1-BC5, the operations further comprising: receiving an input to approve a subset of the preliminary group of images; and transmitting, via the network interface, the subset of the preliminary group of images.

In Example BA1, an electronic device includes a network interface that transmits a registration request of a first user and receives photo identification information including performance image information; a memory that stores a plurality of images; a processor configured to identify a preliminary group of the images, at least in part based on the performance image information; and a display that displays the preliminary group of images.

Example BA2 is the electronic device of Example BA1, wherein the photo identification information includes biometric fingerprint information, and the preliminary group of images is identified at least in part based on the biometric fingerprint information.

Example BA3 is the electronic device of any of Examples BA1-BA2, wherein the registration request includes a verification video including a face of the first user, and the biometric fingerprint information at least in part is based on the face of the first user.

Example BA4 is the electronic device of any of Examples BA1-BA3, further comprising: a user interface that receives an input indicating a preference for a profile of a second user, wherein the display displays the profile of the second user, the network interface transmits an indication of the input, and the photo identification information is at least in part based on the preference.

Example BA5 is the electronic device of any of Examples BA1-BA4, wherein the group of images is identified at least in part based on including a human face.

Example BA6 is the electronic device of any of Examples BA1-BA5, further comprising: a user interface that receives an input to approve a subset of the preliminary group of images.

Example BA7 is the electronic device of Example BA6, wherein the network interface transmits the subset of the preliminary group of images.

In Example CM1, a method includes displaying a profile of a target to a seeker; receiving an input from the seeker; determining a potential interest of the seeker; determining an existing interest of the seeker; determining that the potential interest is an additional interest of the seeker; and adding the potential interest of the seeker to a profile of the seeker.

Example CM2 is the method of Example CM1, further comprising: prompting the seeker to confirm the additional interest.

Example CM3 is the method of any of Examples CM1-CM2, wherein the determining the potential interest of the seeker includes: determining an on-screen portion of the profile of the target; and determining a selected portion of the profile of the target.

Example CM4 is the method of any of Examples CM1-CM3, wherein the determining the potential interest of the seeker includes: determining a previous, off-screen portion of the profile of the target.

Example CM5 is the method of any of Examples CM1-CM4, wherein the determining the potential interest of the seeker includes: performing image recognition on an image displayed in the on-screen portion of the profile of the target.

Example CM6 is the method of any of Examples CM1-CM5, wherein the determining the potential interest of the seeker includes: determining an unseen, off-screen portion of the profile of the target.

Example CM7 is the method of any of Examples CM1-CM6, further comprising: determining an existing interest in the profile of the seeker; and determining that the potential interest is an additional interest of the seeker, at least in part based on the existing interest of the seeker, wherein the adding is performed at least in part based on the determining that the potential interest is an additional interest of the seeker.

Example C8 is the method of Example CM4, wherein the potential interest is at least in part based on the previous, off-screen portion of the profile of the target.

In Example CC1, a computer-readable medium is encoded with executable instructions that, when executed by a processing unit, perform operations including causing a display of a profile of a target to a seeker; determining a potential interest of the seeker, at least in part based on the profile of the target; and adding the potential interest of the seeker to a profile of the seeker.

Example CC2 is the medium of Example CC1, the operations further comprising: prompting the seeker to confirm the additional interest.

Example CC3 is the medium of any of Examples CC1-CC2, the operations further comprising: receiving an input from the seeker regarding an on-screen portion of the profile of the target, wherein the determining the potential interest of the seeker includes determining an on-screen portion of the profile of the target; and determining a selected portion of the profile of the target, at least in part based on the input, and the potential interest is at least in part based on the selected portion of the profile of the target.

Example CC4 is the medium of any of Examples CC1-CC3, wherein the determining the potential interest of the seeker includes determining a previous, off-screen portion of the profile of the target, and the potential interest is at least in part based on the previous, off-screen portion of the profile of the target.

Example CC5 is the medium of any of Examples CC3-CC4, wherein the determining the potential interest of the seeker includes performing image recognition on an image displayed in the selected portion of the profile of the target, at least in part based on the input, and the potential interest is at least in part based on the image recognition.

Example CC6 is the medium of any of Examples CC1-CC5, wherein the determining the potential interest of the seeker includes determining an unseen, off-screen portion of the profile of the target.

Example CC7 is the medium of any of Examples CC1-CC6, the operations further comprising: determining an existing interest in the profile of the seeker; and determining that the potential interest is an additional interest of the seeker, at least in part based on the existing interest of the seeker, wherein the adding is performed at least in part based on the determining that the potential interest is an additional interest of the seeker.

In Example CA1, an apparatus includes a memory that stores an instruction; and at least one processor configured to execute the instruction to cause the apparatus to at least cause a display of a profile of a target to a seeker, determine a potential interest of the seeker, at least in part based on the profile of the target, and add the potential interest of the seeker to a profile of the seeker.

Example CA2 is the apparatus of Example CA1, wherein the at least one processor is further configured to execute the instruction to cause the apparatus to at least prompt the seeker to confirm the additional interest.

Example CA3 is the apparatus of any of Examples CA1-CA2, wherein the at least one processor is further configured to execute the instruction to cause the apparatus to at least receive an input from the seeker regarding an on-screen portion of the profile of the target, the determining the potential interest of the seeker includes determining an on-screen portion of the profile of the target and determining a selected portion of the profile of the target, at least in part based on the input, and the potential interest is at least in part based on the selected portion of the profile of the target.

Example CA4 is the apparatus of any of Examples CA1-CA3, wherein the determining the potential interest of the seeker includes determining a previous, off-screen portion of the profile of the target, and the potential interest is at least in part based on the previous, off-screen portion of the profile of the target.

Example CA5 is the apparatus of any of Examples CA3-CA4, wherein the determining the potential interest of the seeker includes performing image recognition on an image displayed in the selected portion of the profile of the target, at least in part based on the input, and the potential interest is at least in part based on the image recognition.

Example CA6 is the apparatus of any of Examples CA1-CA5, wherein the determining the potential interest of the seeker includes determining an unseen, off-screen portion of the profile of the target.

Example CA7 is the apparatus of any of Examples CA1-CA6, wherein the at least one processor is further configured to execute the instruction to cause the apparatus to at least determine an existing interest in the profile of the seeker and determine that the potential interest is an additional interest of the seeker, at least in part based on the existing interest of the seeker, wherein the adding is performed at least in part based on the determining that the potential interest is an additional interest of the seeker.

In Example DM1, a method includes receiving a profile of a seeker, the profile indicating an interest of the seeker; determining a target for the seeker; determining the interest of the seeker and an interest of the target; determining a shared interest, at least in part based on the interest of the target; and causing a display of a profile of the target to the seeker, the display emphasizing the shared interest.

Example DM2 is the method of Example DM1, further comprising: determining a colleague of the seeker, at least in part based on the interest of the seeker; and determining an interest of the colleague of the seeker, wherein the shared interest at least in part is based on the interest of the colleague of the seeker.

Example DM3 is the method of any of Examples DM1-DM2, further comprising: determining a colleague of the seeker, at least in part based on the interest of the seeker; determining a crush of the colleague of the seeker; and determining an interest of the crush of the colleague of the seeker, wherein the shared interest at least in part is based on the interest of the crush of the colleague of the seeker.

Example DM4 is the method of any of Examples DM1-DM3, further comprising: determining that a crush has been received from the seeker; determining the crush of the seeker; and determining an interest of the crush of the seeker, wherein the shared interest at least in part is based on the interest of the crush of the seeker.

Example DM5 is the method of Example DM4, further comprising: determining an admirer of the crush of the seeker; and determining an interest of the admirer of the crush of the seeker, wherein the shared interest at least in part is based on the interest of the admirer of the crush of the seeker.

Example DM6 is the method of any of Examples DM4-DM5, further comprising: determining a colleague of the crush of the seeker, at least in part based on the interest of the crush of the seeker; and determining an interest of the colleague of the crush of the seeker, wherein the shared interest at least in part is based on the interest of the colleague of the crush of the seeker.

Example DM7 is the method of Example DM6, further comprising: determining an admirer of the colleague of the crush of the seeker; and determining an interest of the admirer of the colleague of the crush of the seeker, wherein the shared interest at least in part is based on the interest of the admirer of the colleague of the crush.

Example DM8 is the method of Example DM7, further comprising: determining a crush of the admirer of the colleague of the crush of the seeker; and determining an interest of the crush of the admirer of the colleague of the crush of the seeker, wherein the shared interest at least in part is based on the interest of the crush of the admirer of the colleague of the crush of the seeker.

In Example DA1, an apparatus includes a network interface that receives a profile of a target and a profile of a seeker, the profile of the seeker indicating an interest of the seeker, the profile of the target indicating an interest of the target; and a processor configured to determine to suggest the target to the seeker, determine a shared interest, at least in part based on the interest of the target, and cause a display of the profile of the target to the seeker, the display to emphasize the shared interest.

Example DA2 is the apparatus of Example DA1, wherein the processor is further configured to determine a colleague of the seeker, at least in part based on the interest of the seeker and a first interest of the colleague, and determine a second interest of the colleague of the seeker, and the shared interest at least in part is based on the second interest of the colleague of the seeker.

Example DA3 is the apparatus of any of Examples DA1-DA2, wherein the processor is further configured to determine a colleague of the seeker, at least in part based on the interest of the seeker and an interest of the colleague, the processor is further configured to determine whether favorable feedback has been received from the colleague of the seeker regarding a profile of a crush of the colleague of the seeker, the processor is further configured to determine an interest of the crush of the colleague of the seeker, and the shared interest at least in part is based on the interest of the crush of the colleague of the seeker.

Example DA4 is the apparatus of any of Examples DA1-DA3, wherein the processor is further configured to determine that favorable feedback has been received from the seeker regarding a profile of a crush of the seeker, and determine an interest of the crush of the seeker, and the shared interest at least in part is based on the interest of the crush of the seeker.

Example DA5 is the apparatus of DA4, wherein the processor is further configured to determine whether favorable feedback has been received from an admirer regarding the profile of the crush of the seeker, the processor is further configured to determine an interest of the admirer of the crush of the seeker, and the shared interest at least in part is based on the interest of the admirer of the crush of the seeker.

Example DA6 is the apparatus of any of Examples DA4-DA5, wherein the processor is further configured to determine a colleague of the crush of the seeker, at least in part based on the interest of the crush of the seeker and an interest of the colleague of the crush of the seeker, and the shared interest at least in part is based on the interest of the colleague of the crush of the seeker.

Example DA7 is the apparatus of Example DA6, wherein the processor is further configured to determine that positive feedback has been received from an admirer of the colleague of the crush of the seeker regarding a profile of the colleague of the crush of the seeker, the processor is further configured to determine that positive feedback has been received from the admirer of the colleague of the crush of the seeker regarding a profile of a crush of the admirer of the colleague of the crush of the seeker, the profile of the crush of the admirer of the colleague of the crush of the seeker indicating an interest, and the shared interest at least in part is based on the interest of the crush of the admirer of the colleague of the crush of the seeker.

In Example DC1, a computer-readable medium is encoded with executable instructions that, when executed by a processing unit, perform operations including receiving a profile of a target and a profile of a seeker, the profile of the seeker indicating an interest of the seeker, the profile of the target indicating an interest of the target; determining to suggest the target to the seeker; determining a shared interest, at least in part based on the interest of the target; and causing a display of the profile of the target to the seeker, the display to emphasize the shared interest.

Example DC2 is the medium of Example DC1, the operations further comprising: determining a colleague of the seeker, at least in part based on the interest of the seeker and a first interest of the colleague; and determining a second interest of the colleague of the seeker, wherein the shared interest at least in part is based on the second interest of the colleague of the seeker.

Example DC3 is the medium of any of Examples DC1-DC2, the operations further comprising: determining a colleague of the seeker, at least in part based on the interest of the seeker and an interest of the colleague; determining whether favorable feedback has been received from the colleague of the seeker regarding a profile of a crush of the colleague of the seeker; and determining an interest of the crush of the colleague of the seeker, wherein the shared interest at least in part is based on the interest of the crush of the colleague of the seeker.

Example DC4 is the medium of any of Examples DC1-DC3, the operations further comprising: determining that favorable feedback has been received from the seeker regarding a profile of a crush of the seeker; and determining an interest of the crush of the seeker, wherein the shared interest at least in part is based on the interest of the crush of the seeker.

Example DC5 is the medium of Example DC4, the operations further comprising: determining whether favorable feedback has been received from an admirer regarding the profile of the crush of the seeker; and determining an interest of the admirer of the crush of the seeker, wherein the shared interest at least in part is based on the interest of the admirer of the crush of the seeker.

Example DC6 is the medium of any of Examples DC4-DC5, the operations further comprising: determining a colleague of the crush of the seeker, at least in part based on the interest of the crush of the seeker and an interest of the colleague of the crush of the seeker, wherein the shared interest at least in part is based on the interest of the colleague of the crush of the seeker.

Example DC7 is the medium of Example DC6, the operations further comprising: determining that positive feedback has been received from an admirer of the colleague of the crush of the seeker regarding a profile of the colleague of the crush of the seeker; and determining that positive feedback has been received from the admirer of the colleague of the crush of the seeker regarding a profile of a crush of the admirer of the colleague of the crush of the seeker, the profile of the crush of the admirer of the colleague of the crush of the seeker indicating an interest, wherein the shared interest at least in part is based on the interest of the crush of the admirer of the colleague of the crush of the seeker.

In Example EM1, a method includes determining a cohort of a seeker in a matching community; determining a target in the matching community for the seeker, the matching community including a profile of the target, the profile of the target including a plurality of elements; determining an element of the plurality of elements, at least in part based on the cohort of the seeker; and causing a display of the profile of the target over a plurality of pages, a first page of the plurality of pages including the element.

Example EM2 is the method of Example EM1, further comprising: determining a matching characteristic of the seeker and the target, wherein the element is determined at least in part based on the matching characteristic.

Example EM3 is the method of Example EM2, wherein the matching characteristic is a relationship goal.

Example EM4 is the method of any of Examples EM1-EM3, further comprising: causing the display to transition from the first page of the profile of the target to a second page of the profile of the target.

Example EM5 is the method of any of Examples EM1-EM2 or EM4, wherein the cohort of the seeker identifies as female, and the element includes a biography of the target.

Example EM6 is the method of any of Examples EM1-EM2 or EM4, wherein the cohort of the seeker identifies as male, and the element includes a geographical distance of the target.

Example EM7 is the method of any of Examples EM4-EM5, wherein the element includes a predetermined number of lines of a biography of the target, and the predetermined number of lines is determined at least in part based on the cohort of the seeker.

In Example EA1, an apparatus includes a memory that stores an instruction; and at least one processor configured to execute the instruction to cause the apparatus to at least determine a cohort of a seeker in a matching community; determine a target in the matching community for the seeker, the matching community including a profile of the target, the profile of the target including a plurality of elements; determine an element of the plurality of elements, at least in part based on the cohort of the seeker; and cause a display of the profile of the target over a plurality of pages, a first page of the plurality of pages including the element.

Example EA2 is the apparatus of Example EA1, wherein the at least one processor is further configured to execute the instruction to cause the apparatus to at least determine a matching characteristic of the seeker and the target, and the element is determined at least in part based on the matching characteristic.

Example EA3 is the apparatus of Example EA2, wherein the matching characteristic is a relationship goal.

Example EA4 is the apparatus of any of Examples EA1-EA3, wherein the at least one processor is further configured to execute the instruction to cause the apparatus to at least cause the display to transition from the first page of the profile of the target to a second page of the profile of the target.

Example EA5 is the apparatus of any of Examples EA1-EA2 or EA4, wherein the cohort of the seeker identifies as female, and the element includes a biography of the target.

Example EA6 is the apparatus of any of Examples EA1-EA3 or EA4, wherein the cohort of the seeker identifies as male, and the element includes a geographical distance of the target.

Example EA7 is the apparatus of any of Examples EA4-EA5, wherein the element includes a predetermined number of lines of a biography of the target, and the predetermined number of lines is determined at least in part based on the cohort of the seeker.

In Example EC1, a computer-readable medium is encoded with executable instructions that, when executed by a processing unit, perform operations including determining a cohort of a seeker in a matching community; determining a target in the matching community for the seeker, the matching community including a profile of the target, the profile of the target including a plurality of elements; determining an element of the plurality of elements, at least in part based on the cohort of the seeker; and causing a display of the profile of the target over a plurality of pages, a first page of the plurality of pages including the element.

Example EC2 is the medium of Example EC1, the operations further comprising: determining a matching characteristic of the seeker and the target, wherein the element is determined at least in part based on the matching characteristic.

Example EC3 is the medium of Example EC2, wherein the matching characteristic is a relationship goal.

Example EC4 is the medium of any of Examples EC1-EC3, the operations further comprising: causing the display to transition from the first page of the profile of the target to a second page of the profile of the target.

Example EC5 is the medium of any of Examples EM1-EM2 or EM4, wherein the cohort of the seeker identifies as female, and the element includes a biography of the target.

Example EC6 is the medium of any of Examples EM1-EM2 or EM4, wherein the cohort of the seeker identifies as male, and the element includes a geographical distance of the target.

Example EC7 is the medium of any of Examples EC4-EC5, wherein the element includes a predetermined number of lines of a biography of the target, and the predetermined number of lines is determined at least in part based on the cohort of the seeker.

In Example FM1, a method is implemented by a computing device. The method includes identifying an image stored on the computing device; obtaining a count of one or more faces of the image; and displaying the image on a display of the computing device, at least in part based on a determination whether the count of the one or more faces of the image exceeds a predetermined number and a determination whether the image is recent.

Example FM2 is the method of Example FM1, further comprising: obtaining an embedding of the one or more faces of the image; and calculating a distance of the embedding to an embedding of a target image, wherein the image is displayed at least in part based on a determination whether the distance is greater than or equal to a predetermined threshold.

Example FM3 is the method of Example FM2, further comprising: taking a photo with a camera of the computing device to produce the target image.

Example FM4 is the method of any of Examples FM1-FM3, wherein the image is displayed, at least in part based on a determination whether a position of the one or more faces of the image is separated from a closest edge of the image by a predetermined distance.

Example FM5 is the method of any of Examples FM1-FM4, wherein the determination whether the image is recent is at least in part based on a determination whether a timestamp of the image is within a predetermined period of a current date.

Example FM6 is the method of any of Examples FM1-FM5, further comprising: starting a timer, wherein the image is displayed, at least in part based on a determination whether the timer exceeds a predetermined duration.

Example FM7 is the method of any of Examples FM1-FM6, further comprising: uploading the image, at least in part based on a determination that a selection of the image was received.

In Example FA1, a computing device includes a memory that stores at least one instruction and an image; and at least one processor configured to execute the at least one instruction to cause the system to at least identify the image, obtain a count of one or more faces of the image, and cause a display of the image on a display of the computing device, at least in part based on a determination whether the count of the one or more faces of the image exceeds a predetermined number and a determination whether the image is recent.

Example FA2 is the computing device of Example FA1, wherein the at least one processor is further configured to execute the at least one instruction to cause the system to at least obtain an embedding of the one or more faces of the image, and calculate a distance of the embedding to an embedding of a target image, and the image is displayed at least in part based on a determination whether the distance is greater than or equal to a predetermined threshold.

Example FA3 is the computing device of Example FA2, further comprising: a camera that takes a photo to produce the target image.

Example FA4 is the computing device of any of Examples FA1-FA3, wherein the image is displayed, at least in part based on a determination whether a position of the one or more faces of the image is separated from a closest edge of the image by a predetermined distance.

Example FA5 is the computing device of any of Examples FA1-FA4, wherein the determination whether the image is recent is at least in part based on a determination whether a timestamp of the image is within a predetermined period of a current date.

Example FA6 is the computing device of any of Examples FA1-FA5, wherein the at least one processor is further configured to execute the at least one instruction to cause the system to at least start a timer, and the image is displayed, at least in part based on a determination whether the timer exceeds a predetermined duration.

Example FA7 is the computing device of any of Examples FA1-FA6, wherein the at least one processor is further configured to execute the at least one instruction to cause the system to at least upload the image, at least in part based on a determination that a selection of the image was received.

In Example FC1, a computer-readable medium is encoded with a computer program that, when executed by a computing device including at least one processor, causes the system to perform operations. The operations include identifying an image stored on the computing device; obtaining a count of one or more faces of the image; and displaying the image on a display of the computing device, at least in part based on a determination whether the count of the one or more faces of the image exceeds a predetermined number and a determination whether the image is recent.

Example FC2 is the medium of Example FC1, the operations further comprising: obtaining an embedding of the one or more faces of the image; and calculating a distance of the embedding to an embedding of a target image, wherein the image is displayed at least in part based on a determination whether the distance is greater than or equal to a predetermined threshold.

Example FC3 is the medium of Example FC2, the operations further comprising: taking a photo with a camera of the computing device to produce the target image.

Example FC4 is the medium of any of Examples FC1-FC3, wherein the image is displayed, at least in part based on a determination whether a position of the one or more faces of the image is separated from a closest edge of the image by a predetermined distance.

Example FC5 is the medium of any of Examples FC1-FC4, wherein the determination whether the image is recent is at least in part based on a determination whether a timestamp of the image is within a predetermined period of a current date.

Example FC6 is the medium of any of Examples FC1-FC5, the operations further comprising: starting a timer, wherein the image is displayed, at least in part based on a determination whether the timer exceeds a predetermined duration.

Example FC7 is the medium of any of Examples FC1-FC6, the operations further comprising: uploading the image, at least in part based on a determination that a selection of the image was received.

In Example GM1, a method is implemented by a computing device. The method includes identifying a plurality of images stored in the computing device; determining a first image and a second image of the plurality of images have a timestamp that is within a predetermined duration of each other; and uploading the first image, at least in part based on a determination that a popularity score of the first image is higher than a popularity score of the second image.

Example GM2 is the method of Example GM1, wherein the predetermined duration is one minute.

Example GM3 is the method of any of Examples GM1-GM2, further comprising: starting a timer relative to the identifying, wherein the first image is uploaded, at least in part based on a determination whether the timer exceeds a predetermined duration.

Example GM4 is the method of any of Examples GM1-GM3, wherein the first image is uploaded, at least in part based on a determination that a respective geo-coordinate of the first and second images are within a predetermined distance of each other.

Example GM5 is the method of any of Examples GM1-GM4, further comprising: determining the respective popularity scores of each of the first and second images; and ranking the first and second images, at least in part based on the respective popularity scores.

Example GM6 is the method of Example GM5, wherein the at least one image is uploaded, at least in part based on a determination that the respective popularity score of the first image is the highest among the respective popularity scores of the plurality of images.

Example GM7 is the method of any of Examples GM1-GM6, further comprising: displaying the first image, wherein the first image is uploaded at least in part based on a determination that a selection of the first image is received.

In Example GA1, a computing device includes a memory that stores at least one instruction and a plurality of images; and at least one processor configured to execute the at least one instruction to cause the system to at least identify the plurality of images, determine a first image and a second image of the plurality of images have a timestamp that is within a predetermined duration of each other, and upload the first image, at least in part based on a determination that a popularity score of the first image is higher than a popularity score of the second image.

Example GA2 is the computing device of Example GA1, wherein the predetermined duration is one minute.

Example GA3 is the computing device of any of Examples GA1-GA2, wherein the at least one processor is further configured to execute the at least one instruction to cause the system to at least start a timer relative to the identifying, and the first image is uploaded, at least in part based on a determination whether the timer exceeds a predetermined duration.

Example GA4 is the computing device of any of Examples GA1-GA3, wherein the first image is uploaded, at least in part based on a determination that a respective geo-coordinate of the first and second images are within a predetermined distance of each other.

Example GA5 is the computing device of any of Examples GA1-GA4, wherein the at least one processor is further configured to execute the at least one instruction to cause the system to at least determine the respective popularity scores of each of the first and second images, and rank the first and second images, at least in part based on the respective popularity scores.

Example GA6 is the computing device of Example GA5, wherein the at least one image is uploaded, at least in part based on a determination that the respective popularity score of the first image is the highest among the respective popularity scores of the plurality of images.

Example GA7 is the computing device of any of Examples GA1-GA6, wherein the at least one processor is further configured to execute the at least one instruction to cause the system to at least cause a display of the first image, and the first image is uploaded at least in part based on a determination that a selection of the first image is received.

In Example GC1, a computer-readable medium is encoded with a computer program that, when executed by a computing device including at least one processor, causes the system to perform operations. The operations include identifying a plurality of images stored in the computing device; determining a first image and a second image of the plurality of images have a timestamp that is within a predetermined duration of each other; and uploading the first image, at least in part based on a determination that a popularity score of the first image is higher than a popularity score of the second image.

Example GC2 is the medium of Example GC1, wherein the predetermined duration is one minute.

Example GC3 is the medium of any of Examples GC1-GC2, the operations further comprising: starting a timer relative to the identifying, wherein the first image is uploaded, at least in part based on a determination whether the timer exceeds a predetermined duration.

Example GC4 is the medium of any of Examples GC1-GC3, wherein the first image is uploaded, at least in part based on a determination that a respective geo-coordinate of the first and second images are within a predetermined distance of each other.

Example GC5 is the medium of any of Examples GC1-GC4, the operations further comprising: determining the respective popularity scores of each of the first and second images; and ranking the first and second images, at least in part based on the respective popularity scores.

Example GC6 is the medium of Example GC5, wherein the at least one image is uploaded, at least in part based on a determination that the respective popularity score of the first image is the highest among the respective popularity scores of the plurality of images.

Example GC7 is the medium of any of Examples GC1-GC6, the operations further comprising: causing a display of the first image, wherein the first image is uploaded at least in part based on a determination that a selection of the first image is received.

In Example HM1, a method is implemented by a computing device. The method includes taking a first photo with a camera of the computing device; determining an embedding of the first photo; identifying a second photo stored in the computing device, at least in part based on the embedding of the first photo; and uploading the second photo.

Example HM2 is the method of Example HM1, further comprising: obtaining a count of one or more faces in the first photo, wherein the second photo is uploaded, at least in part based on a determination whether the count of the one or more faces in the first photo exceeds a predetermined threshold.

Example HM3 is the method of Example HM2, further comprising: displaying the count of the one or more faces in the first photo, at least in part based on a determination whether the count of the one or more faces in the first photo exceeds a predetermined threshold.

Example HM4 is the method of any of Examples HM1-HM3, further comprising: obtaining a position of a face in the first photo, wherein the second photo is uploaded, at least in part based on a determination whether the position of the face in the first photo is separated from an edge of the first photo that is closest to the face by at least a predetermined distance.

Example HM5 is the method of any of Examples HM1-HM4, further comprising: determining an embedding of a face of the second photo, wherein the second photo is uploaded at least in part based on a determination whether a distance between the embedding of the first photo and the embedding of the second photo is less than a predetermined distance.

Example HM6 is the method of any of Examples HM1-HM5, wherein the second photo is stored in a camera roll or a picture album of the computing device.

Example HM7 is the method of any of Examples HM1-HM6, further comprising: displaying the second photo, wherein the second photo is uploaded, at least in part based on a determination that a selection of the second photo was received.

In Example HA1, a computing device includes a memory that stores at least one instruction; and at least one processor configured to execute the at least one instruction to cause the system to at least take a first photo with a camera of the computing device, determine an embedding of the first photo, identify a second photo stored in the computing device, at least in part based on the embedding of the first photo, and upload the second photo.

Example HA2 is the computing device of Example HA1, wherein the at least one processor is further configured to execute the at least one instruction to cause the system to at least obtain a count of one or more faces in the first photo, and the second photo is uploaded, at least in part based on a determination whether the count of the one or more faces in the first photo exceeds a predetermined threshold.

Example HA3 is the computing device of Example HA2, wherein the at least one processor is further configured to execute the at least one instruction to cause the system to at least display the count of the one or more faces in the first photo, at least in part based on a determination whether the count of the one or more faces in the first photo exceeds a predetermined threshold.

Example HA4 is the computing device of any of Examples HA1-HA3, wherein the at least one processor is further configured to execute the at least one instruction to cause the system to at least obtain a position of a face in the first photo, and the second photo is uploaded, at least in part based on a determination whether the position of the face in the first photo is separated from an edge of the first photo that is closest to the face by at least a predetermined distance.

Example HA5 is the computing device of any of Examples HA1-HA4, wherein the at least one processor is further configured to execute the at least one instruction to cause the system to at least determine an embedding of a face of the second photo, and the second photo is uploaded at least in part based on a determination whether a distance between the embedding of the first photo and the embedding of the second photo is less than a predetermined distance.

Example HA6 is the computing device of any of Examples HA1-HA5, further comprising: a camera roll or picture album that stores the second photo.

Example HA7 is the computing device of any of Examples HA1-HA6, wherein the at least one processor is further configured to execute the at least one instruction to cause the system to at least cause a display of the second photo, and the second photo is uploaded, at least in part based on a determination that a selection of the second photo was received.

In Example HC1, a computer-readable medium is encoded with a computer program that, when executed by a system including at least one processor, causes the system to perform operations. The operations include taking a first photo with a camera of the computing device; determining an embedding of the first photo; identifying a second photo stored in the computing device, at least in part based on the embedding of the first photo; and uploading the second photo.

Example HC2 is the medium of Example HC1, the operations further comprising: obtaining a count of one or more faces in the first photo, wherein the second photo is uploaded, at least in part based on a determination whether the count of the one or more faces in the first photo exceeds a predetermined threshold.

Example HC3 is the medium of Example HC2, the operations further comprising: displaying the count of the one or more faces in the first photo, at least in part based on a determination whether the count of the one or more faces in the first photo exceeds a predetermined threshold.

Example HC4 is the medium of any of Examples HC1-HC3, the operations further comprising: obtaining a position of a face in the first photo, wherein the second photo is uploaded, at least in part based on a determination whether the position of the face in the first photo is separated from an edge of the first photo that is closest to the face by at least a predetermined distance.

Example HC5 is the medium of any of Examples HC1-HC4, the operations further comprising: determining an embedding of a face of the second photo, wherein the second photo is uploaded at least in part based on a determination whether a distance between the embedding of the first photo and the embedding of the second photo is less than a predetermined distance.

Example HC6 is the medium of any of Examples HC1-HC5, wherein the second photo is stored in a camera roll or a picture album of the computing device.

Example HC7 is the medium of any of Examples HC1-HC6, the operations further comprising: displaying the second photo, wherein the second photo is uploaded, at least in part based on a determination that a selection of the second photo was received.

We claim:

1. A method implemented by a computing device, the method comprising:

taking a first photo with a camera of the computing device;

determining an embedding of the first photo;

obtaining a position of a face in the first photo;

identifying a second photo stored in the computing device, at least in part based on the embedding of the first photo; and uploading the second photo, wherein the second photo is uploaded, at least in part based on a determination whether the position of the face in the first photo is separated from an edge of the first photo that is closest to the face by at least a predetermined distance.

2. The method of claim 1, further comprising:

obtaining a count of one or more faces in the first photo, wherein the second photo is uploaded, at least in part based on a determination whether the count of the one or more faces in the first photo exceeds a predetermined threshold.

3. The method of claim 2, further comprising:

displaying the count of the one or more faces in the first photo, at least in part based on a determination whether the count of the one or more faces in the first photo exceeds a predetermined threshold.

4. The method of claim 1, further comprising:

determining an embedding of a face of the second photo, wherein the second photo is uploaded at least in part based on a determination whether a distance between the embedding of the first photo and the embedding of the second photo is less than a predetermined distance.

5. The method of claim 1, wherein the second photo is stored in a camera roll or a picture album of the computing device.

6. The method of claim 1, further comprising:

displaying the second photo, wherein the second photo is uploaded, at least in part based on a determination that a selection of the second photo was received.

7. A system, comprising:

a memory that stores at least one instruction; and at least one processor configured to execute the at least one instruction to cause the system to at least take a first photo with a camera of the system, determine an embedding of the first photo, obtain a position of a face in the first photo, identify a second photo stored in the system, at least in part based on the embedding of the first photo, and upload the second photo, wherein the second photo is uploaded, at least in part based on a determination whether the position of the face in the first photo is separated from an edge of the first photo that is closest to the face by at least a predetermined distance.

8. The system of claim 7, wherein the at least one processor is further configured to execute the at least one instruction to cause the system to at least obtain a count of one or more faces in the first photo, and the second photo is uploaded, at least in part based on a determination whether the count of the one or more faces in the first photo exceeds a predetermined threshold.

9. The system of claim 8, wherein the at least one processor is further configured to execute the at least one instruction to cause the system to at least display the count of the one or more faces in the first photo, at least in part based on a determination whether the count of the one or more faces in the first photo exceeds a predetermined threshold.

10. The system of claim 7, wherein the at least one processor is further configured to execute the at least one instruction to cause the system to at least determine an embedding of a face of the second photo, and the second photo is uploaded at least in part based on a determination whether a distance between the embedding of the first photo and the embedding of the second photo is less than a predetermined distance.

11. The system of claim 7, further comprising:

a camera roll or picture album that stores the second photo.

12. The system of claim 7, wherein the at least one processor is further configured to execute the at least one instruction to cause the system to at least cause a display of the second photo, and the second photo is uploaded, at least in part based on a determination that a selection of the second photo was received.

13. A non-transitory computer-readable medium encoded with a computer program that, when executed by a system including at least one processor, causes the system to perform operations comprising:

taking a first photo with a camera of the system;

determining an embedding of the first photo;

obtaining a position of a face in the first photo;

identifying a second photo stored in the system, at least in part based on the embedding of the first photo; and uploading the second photo, wherein the second photo is uploaded, at least in part based on a determination whether the position of the face in the first photo is separated from an edge of the first photo that is closest to the face by at least a predetermined distance.

14. The medium of claim 13, the operations further comprising:

obtaining a count of one or more faces in the first photo, wherein the second photo is uploaded, at least in part based on a determination whether the count of the one or more faces in the first photo exceeds a predetermined threshold.

15. The medium of claim 14, the operations further comprising:

displaying the count of the one or more faces in the first photo, at least in part based on a determination whether the count of the one or more faces in the first photo exceeds a predetermined threshold.

16. The medium of claim 13, the operations further comprising:

determining an embedding of a face of the second photo, wherein the second photo is uploaded at least in part based on a determination whether a distance between the embedding of the first photo and the embedding of the second photo is less than a predetermined distance.

17. The medium of claim 13, wherein the second photo is stored in a camera roll or a picture album of the system.

18. A method implemented by a computing device, the method comprising:

taking a first photo with a camera of the computing device;

determining an embedding of the first photo;

identifying a second photo stored in the computing device, at least in part based on the embedding of the first photo;

determining an embedding of a face of the second photo; and uploading the second photo, wherein the second photo is uploaded at least in part based on a determination whether a distance between the embedding of the first photo and the embedding of the second photo is less than a predetermined distance.

19. The method of claim 18, further comprising:

obtaining a count of one or more faces in the first photo, wherein the second photo is uploaded, at least in part based on a determination whether the count of the one or more faces in the first photo exceeds a predetermined threshold.

20. The method of claim 18, further comprising:

displaying the second photo, wherein the second photo is uploaded, at least in part based on a determination that a selection of the second photo was received.

* * * * *